United States Patent
Burt

(10) Patent No.: US 9,534,795 B2
(45) Date of Patent: Jan. 3, 2017

(54) ADVANCED VALVE ACTUATOR WITH REMOTE LOCATION FLOW RESET

(71) Applicant: Alan Burt, Rockford, IL (US)

(72) Inventor: Alan Burt, Rockford, IL (US)

(73) Assignee: Schneider Electric Buildings, LLC, Andover, MA (US)

( * ) Notice: Subject to any disclaimer, the term of this patent is extended or adjusted under 35 U.S.C. 154(b) by 845 days.

(21) Appl. No.: 13/645,660

(22) Filed: Oct. 5, 2012

(65) Prior Publication Data

US 2014/0097367 A1   Apr. 10, 2014

(51) Int. Cl.
| | | |
|---|---|---|
| *F24D 19/10* | (2006.01) | |
| *G05D 7/06* | (2006.01) | |
| *F24F 11/02* | (2006.01) | |
| *F02M 59/46* | (2006.01) | |

(52) U.S. Cl.
CPC ......... *F24D 19/1015* (2013.01); *F02M 59/466* (2013.01); *F24F 11/02* (2013.01); *G05D 7/0623* (2013.01); *G05D 7/0635* (2013.01); *Y10T 137/776* (2015.04); *Y10T 137/7759* (2015.04); *Y10T 137/7761* (2015.04)

(58) Field of Classification Search
CPC ................ G05D 7/0623; G05D 7/0635; Y10T 137/7759; Y10T 137/776; Y10T 13/7761; F02M 59/466; F24D 1/00; F24F 11/02; F24F 19/1015
USPC .................. 137/486, 487, 487.5; 251/129.04
See application file for complete search history.

(56) References Cited

U.S. PATENT DOCUMENTS

| | | |
|---|---|---|
| 1,558,276 A | 10/1925 | Peterson |
| 1,820,473 A | 8/1931 | Milone |
| 3,369,556 A | 2/1968 | Allderdice |
| 3,636,765 A | 1/1972 | Brown |
| 3,761,196 A | 9/1973 | Weinert |
| 3,880,399 A | 4/1975 | Luthe |
| 4,028,689 A | 6/1977 | Schopp |
| 4,036,051 A | 7/1977 | Fell et al. |
| 4,066,090 A | 1/1978 | Nakajima et al. |
| 4,108,210 A | 8/1978 | Luthe et al. |

(Continued)

FOREIGN PATENT DOCUMENTS

| | | |
|---|---|---|
| JP | H0658598 A | 3/1994 |
| JP | H06300397 A | 10/1994 |

(Continued)

OTHER PUBLICATIONS

Knowledge is Power—The Belimo Energy Valve™, brochure; known prior to Aug. 6, 2012; 4 pages; BELIMO Americas, Danbury, CT.

(Continued)

*Primary Examiner* — William McCalister
(74) *Attorney, Agent, or Firm* — Reinhart Boerner Van Deuren P.C.

(57) ABSTRACT

An fluid control valve and actuator assembly includes a valve configured to control a flow of liquid, and a valve actuator configured to control opening and closing of the valve, and further configured to provide both a maximum flow rate and a minimum flow rate of the liquid through the valve. In a particular embodiment, the valve actuator has a communications module configured to facilitate communication with the valve actuator over a network, and further configured to allow both remote monitoring of the flow through the valve, and remote control of the valve actuator.

28 Claims, 9 Drawing Sheets

(56) References Cited

U.S. PATENT DOCUMENTS

| | | | |
|---|---|---|---|
| 4,149,563 A | 4/1979 | Seger | |
| 4,224,825 A | 9/1980 | Feller | |
| 4,245,501 A | 1/1981 | Feller | |
| 4,250,747 A | 2/1981 | Diprose et al. | |
| 4,286,613 A | 9/1981 | Lacoste | |
| 4,333,354 A | 6/1982 | Feller | |
| 4,388,003 A | 6/1983 | Feller | |
| 4,393,919 A | 7/1983 | Anderson | |
| 4,403,871 A | 9/1983 | Feller | |
| 4,412,647 A | 11/1983 | Lampert | |
| 4,415,279 A | 11/1983 | Beuse et al. | |
| 4,469,118 A | 9/1984 | Walters | |
| 4,473,307 A | 9/1984 | Dobronyi et al. | |
| 4,482,006 A | 11/1984 | Anderson | |
| 4,567,915 A | 2/1986 | Bates et al. | |
| 4,635,668 A | 1/1987 | Netter | |
| 4,650,155 A | 3/1987 | Liantonio | |
| 4,657,038 A | 4/1987 | Lyons | |
| 4,679,592 A | 7/1987 | Lamb | |
| 4,694,390 A | 9/1987 | Lee | |
| 4,739,794 A | 4/1988 | Ballun | |
| 4,848,389 A | 7/1989 | Pirkle | |
| 4,860,993 A | 8/1989 | Goode | |
| 4,909,076 A | 3/1990 | Busch et al. | |
| 5,018,703 A | 5/1991 | Goode | |
| 5,086,806 A * | 2/1992 | Engler et al. | 137/486 |
| 5,090,436 A | 2/1992 | Hoch, Jr. et al. | |
| 5,113,892 A | 5/1992 | Hull et al. | |
| 5,170,361 A * | 12/1992 | Reed | 700/283 |
| 5,209,401 A * | 5/1993 | Fiedrich | 237/8 C |
| 5,220,937 A | 6/1993 | Roberts et al. | |
| 5,402,822 A | 4/1995 | Brouwer et al. | |
| 5,428,994 A | 7/1995 | Wenzel et al. | |
| 5,472,014 A * | 12/1995 | Carlson | 137/556 |
| 5,553,505 A | 9/1996 | Bignell et al. | |
| 5,573,032 A | 11/1996 | Lenz et al. | |
| 5,643,482 A | 7/1997 | Sandelman et al. | |
| 5,692,535 A | 12/1997 | Walters | |
| 5,758,684 A | 6/1998 | Hudson et al. | |
| 5,775,369 A | 7/1998 | Hagmann | |
| 5,911,238 A * | 6/1999 | Bump et al. | 137/487.5 |
| 6,012,294 A | 1/2000 | Utsumi | |
| 6,039,304 A | 3/2000 | Carlson et al. | |
| 6,056,008 A | 5/2000 | Adams et al. | |
| 6,125,873 A | 10/2000 | Brown | |
| 6,155,283 A | 12/2000 | Hansen et al. | |
| 6,161,764 A | 12/2000 | Jatnieks | |
| 6,178,996 B1 | 1/2001 | Suzuki | |
| 6,216,727 B1 * | 4/2001 | Genova et al. | 137/487.5 |
| 6,286,764 B1 * | 9/2001 | Garvey et al. | 236/12.12 |
| 6,347,748 B1 * | 2/2002 | Lyons | 237/69 |
| 6,352,106 B1 | 3/2002 | Hartman | |
| 6,394,361 B1 * | 5/2002 | Fridmann et al. | 237/8 A |
| 6,471,182 B1 | 10/2002 | McIntosh | |
| 6,505,991 B2 | 1/2003 | Roman | |
| 6,534,942 B2 | 3/2003 | Schmidhuber | |
| 6,612,331 B2 | 9/2003 | Cederstav et al. | |
| 6,622,930 B2 | 9/2003 | Laing et al. | |
| 6,663,349 B1 | 12/2003 | Discenzo et al. | |
| 6,725,167 B2 | 4/2004 | Grumstrup et al. | |
| 6,814,096 B2 | 11/2004 | Vyers et al. | |
| 6,820,631 B2 | 11/2004 | Lehnst et al. | |
| 6,827,100 B1 | 12/2004 | Carlson | |
| 6,837,480 B1 | 1/2005 | Carlson | |
| 6,859,740 B2 | 2/2005 | Stephenson et al. | |
| 6,889,559 B2 | 5/2005 | Gimson | |
| 6,954,683 B2 | 10/2005 | Junk et al. | |
| 6,983,764 B2 * | 1/2006 | Arrowood et al. | 137/636.1 |
| 7,025,328 B2 | 4/2006 | Ulicny et al. | |
| 7,096,093 B1 | 8/2006 | Hansen et al. | |
| 7,104,461 B2 | 9/2006 | Restivo, Sr. et al. | |
| 7,152,628 B2 | 12/2006 | Folk et al. | |
| 7,166,981 B2 | 1/2007 | Kakutani et al. | |
| 7,177,725 B2 * | 2/2007 | Nortier et al. | 700/282 |
| 7,178,783 B2 | 2/2007 | Tuin et al. | |
| RE39,658 E | 5/2007 | Carlson et al. | |
| 7,228,869 B2 | 6/2007 | Wilhelm | |
| 7,228,874 B2 * | 6/2007 | Bolderheij et al. | 137/801 |
| 7,231,931 B2 | 6/2007 | Lull et al. | |
| 7,246,941 B2 | 7/2007 | Shike | |
| 7,266,427 B2 | 9/2007 | Hansen et al. | |
| 7,434,477 B2 | 10/2008 | Lull et al. | |
| 7,451,781 B2 | 11/2008 | Carlson | |
| 7,637,723 B2 | 12/2009 | Sadasivam | |
| 7,691,652 B2 | 4/2010 | Van Der Wiel | |
| 7,734,572 B2 | 6/2010 | Wiemeyer et al. | |
| 7,797,080 B2 | 9/2010 | Durham, III | |
| 7,798,170 B2 | 9/2010 | Hotz et al. | |
| 8,109,289 B2 * | 2/2012 | Trnka et al. | 137/487 |
| 2001/0030309 A1 | 10/2001 | Carlson et al. | |
| 2002/0123856 A1 | 9/2002 | Eryurek | |
| 2003/0080703 A1 | 5/2003 | Elliott et al. | |
| 2004/0173261 A1 | 9/2004 | Stoffers | |
| 2005/0039797 A1 | 2/2005 | Carlson | |
| 2005/0161521 A1 * | 7/2005 | Guyer | 237/12.1 |
| 2006/0037646 A1 | 2/2006 | Wilhelm | |
| 2006/0234414 A1 | 10/2006 | Van Der Wiel | |
| 2006/0260698 A1 | 11/2006 | Bailey et al. | |
| 2007/0012367 A1 | 1/2007 | Hotz et al. | |
| 2008/0173838 A1 | 7/2008 | Schmidig et al. | |
| 2008/0307879 A1 | 12/2008 | Borst et al. | |
| 2009/0009115 A1 | 1/2009 | Grogg et al. | |
| 2009/0090789 A1 * | 4/2009 | Zirkiyev et al. | 237/8 A |
| 2009/0171512 A1 | 7/2009 | Duncan | |
| 2009/0173390 A1 * | 7/2009 | Sluppaug et al. | 137/12 |
| 2009/0240376 A1 * | 9/2009 | Elshafei et al. | 700/282 |
| 2009/0260488 A1 | 10/2009 | Kanazawa et al. | |
| 2010/0107755 A1 | 5/2010 | Van Der Weil | |
| 2010/0108290 A1 | 5/2010 | Maxwell | |
| 2010/0142535 A1 | 6/2010 | Swainston | |
| 2010/0147394 A1 * | 6/2010 | Trnka et al. | 137/12 |
| 2010/0155635 A1 | 6/2010 | Fima | |
| 2010/0251742 A1 | 10/2010 | Tucker et al. | |
| 2011/0153089 A1 | 6/2011 | Tiemann et al. | |
| 2012/0161562 A1 | 6/2012 | Windgassen | |
| 2012/0298224 A1 | 11/2012 | Imanari et al. | |

FOREIGN PATENT DOCUMENTS

| | | |
|---|---|---|
| JP | 2004028476 A | 1/2004 |
| JP | 2001271962 A | 10/2008 |
| WO | WO 99/54987 A1 | 10/1999 |
| WO | WO 2012/065275 A1 | 5/2012 |

OTHER PUBLICATIONS

Knowledge is Power—Belimo Energy Valve™, presentation; known prior to Aug. 6, 2012; 45 pages.

U.S. Appl. No. 13/567,818, filed Aug. 6, 2012, Burt.

* cited by examiner

ADVANCED VALVE ACTUATOR WITH REMOTE LOCATION FLOW RESET

FIELD OF THE INVENTION

This invention generally relates to valves and valve actuators, and more particularly, to valves and valve actuators configured to be controlled electronically.

BACKGROUND OF THE INVENTION

Many types of commercial and industrial systems involve processes in which liquids are supplied via fluid control systems that may include a variety of both pumping assemblies and control valves. These fluid control systems include, but are not limited to, those used in electrical power stations, chemical manufacturing operations, food and beverage processing, liquid gas supply and disposal, water supply and disposal, heating, ventilation, and air conditioning (HVAC) systems, etc. Improving the control mechanisms for the various components of these fluid control systems may reduce energy usage and increase the efficiency of these systems.

For example, with conventional fluid control systems, the control valves may have a maximum flow setting that can be locally set, but is not adjustable from a remote location. Further, many conventional fluid control systems cannot properly handle HVAC control applications involving two pipe changeover heating/cooling water systems, seasonal changeovers, and energy synchronization with a building's centrifugal chillers and condensing boilers, or with the building management system (BMS). A building management system implemented using a communications network is disclosed in U.S. Patent Publication No. 2010/0142535, the teachings and disclosure of which is incorporated herein by reference thereto.

Embodiments of the present invention represent an advancement over the state of the art with respect to fluid control systems and the control thereof. These and other advantages of the invention, as well as additional inventive features, will be apparent from the description of the invention provided herein.

BRIEF SUMMARY OF THE INVENTION

In one aspect, embodiments of the invention provide a fluid control valve and actuator assembly includes a valve configured to control a flow of liquid into an HVAC coil, and a valve actuator configured to control opening and closing of the valve, and further configured to provide both a maximum flow rate and a minimum flow rate of the liquid through the valve. In a particular embodiment, the valve actuator has a communications module configured to facilitate communication with the valve actuator over a network, and further configured to allow both remote monitoring of the flow through the valve, and remote control of the valve actuator.

In a particular embodiment, the communications module is configured to communicate with a building management system (BMS) over a serial communications bus. Signals from the BMS may be retentively stored by the valve actuator, allowing the valve actuator to function properly if communication with the BMS is lost. Further, the valve actuator is configured such that its operation can be synchronized with the BMS, and with a building's mechanical heating, cooling, and pumping systems to increase energy efficiency of the building's HVAC system.

In certain embodiments, the minimum flow rate and the maximum flow rate can be adjusted either locally or remotely. Further, the maximum flow rate is maintained via modulation of a valve plug position by the valve actuator, wherein the maximum flow rate serves to limit the flow rate of liquid through the valve and HVAC coil to allow adequate time for heat transfer from the liquid to the HVAC coil. The maximum flow rate can be adjusted locally or remotely either to save energy in two-pipe water temperature changeover systems, or to compensate for piping and coil degradation. Alternatively, the maximum flow rate can be adjusted locally or remotely either to facilitate energy synchronization with the chillers and boiler, or to prevent coil overflow and maintain energy-efficient temperature differentials.

In embodiments of the invention, the minimum flow rate is maintained via modulation of a valve plug position by the valve actuator, wherein the minimum flow rate serves to prevent freezing of the liquid in the HVAC coil while minimizing energy consumption, and, in certain embodiments, may be used to decrease energy usage by the building's mechanical equipment, including chillers and boilers, by maintaining a minimum load on the equipment to allow operation at the most efficient operating level. In alternate embodiments, the minimum flow rate serves to maintain a minimum temperature differential across the valve inlet and outlet.

In at least one embodiment, the valve actuator also includes a temperature sensor, a flow rate meter, inlet and outlet pressure sensors, and a plug position sensor, and data from the temperature sensor, flow rate meter, inlet and outlet pressure sensors, and plug position sensor is accessible either locally or remotely.

In a further embodiment, the valve actuator also includes an anti-cavitation module configured to determine if the liquid flowing through the valve is likely to cavitate. The anti-cavitation module determines a likelihood that cavitation will occur based on water temperature, valve inlet pressure, and valve outlet pressure. Also, the anti-cavitation module may be configured to modify its determination of the likelihood that cavitation will occur based on whether the liquid is water or a water-anti-freeze mixture.

In an embodiment, the valve actuator includes a diagnostics module configured to provide diagnostic information on operation of the valve and actuator assembly to a remote location. The diagnostics module provides diagnostic information regarding a number of cavitation occurrences, and a number of freeze condition occurrences for a predetermined period. Further, the valve actuator may be configured to retentively store the diagnostics information.

In particular embodiments, the valve actuator has a plurality of adjustable operating parameters, whose values control the operation of the valve actuator. Further, the plurality of adjustable operating parameters can be adjusted either locally or remotely.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Most of the embodiments described hereinbelow illustrate how aspects of the invention may be employed in HVAC applications. However, nothing contained herein is intended to limit the invention to HVAC applications. One of ordinary skill in the art will recognize that, as implied above, aspects of the invention have applicability in a variety of commercial and industrial settings, including, but not limited to, electrical power generation, chemical manufacturing, food and beverage processing, liquid gas supply and disposal, water supply and disposal, and the like. Further, Applicants note that, while some of the drawings described below have particular applicability to HVAC systems, other drawings are illustrative of embodiments having applicability across a range of fluid control systems.

Figure 1:
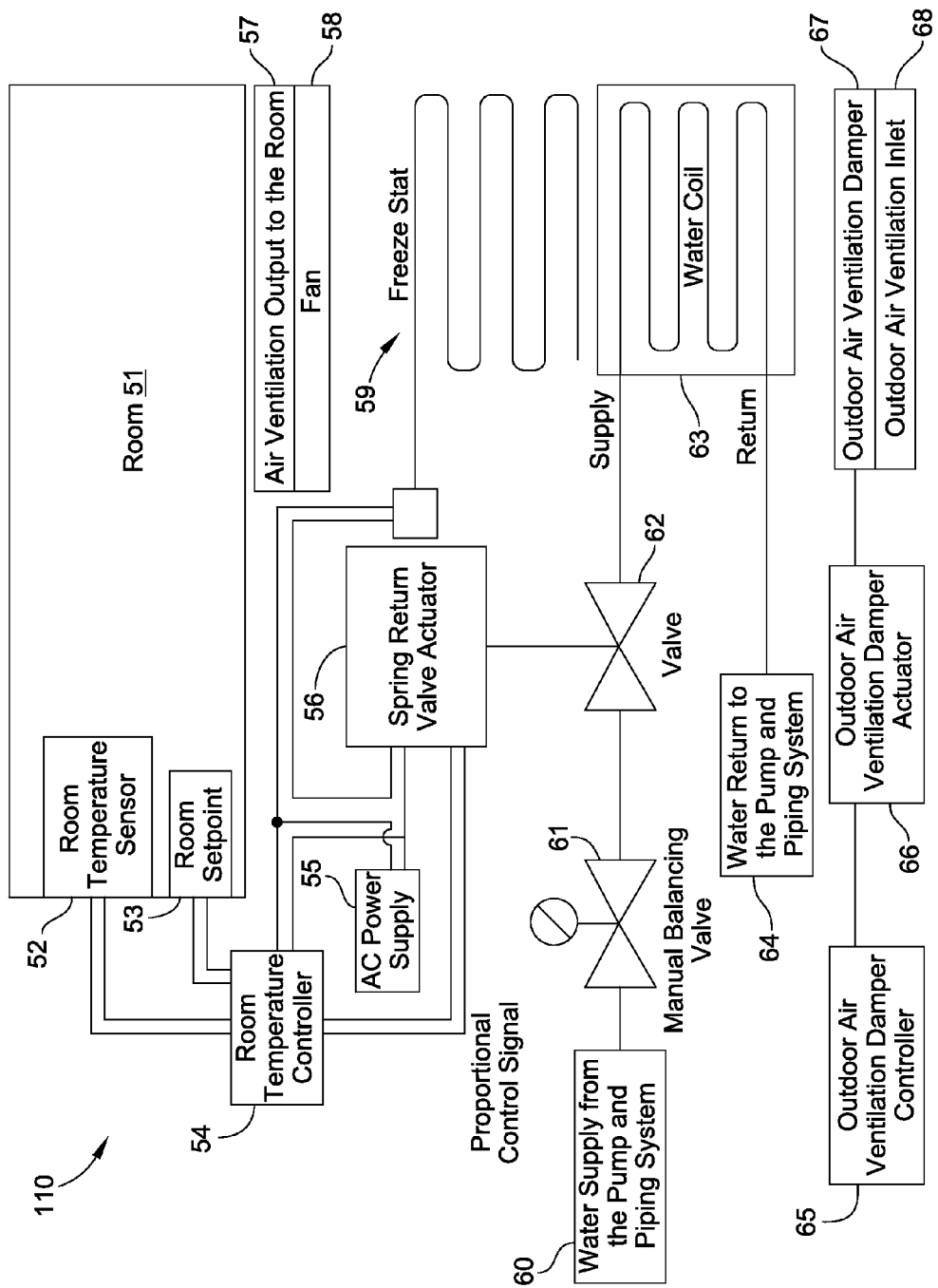
FIG. 1 is a schematic diagram of a prior art HVAC valve configuration with water coil freeze protection.

FIGS. 1-4 are schematic illustrations showing various embodiments of HVAC systems provided in the prior art. For example, FIG. 1 is a schematic diagram showing a conventional HVAC system 110 that requires multiple devices to obtain the required water valve control and water coil freeze protection. The source of the hot and cold water for the water supply from the pump and piping system 60 is generally located outside of the room 51, and is usually a centralized supply consisting of one or more boilers or chillers (not shown) that can be alternately connected within the source. The valve 62 modulates the flow of hot and cold water from the water supply from the pump and piping system 60 for heating and/or cooling of the room 51. Typically, the valve 62 is mechanically driven by the spring return valve actuator 56 that is operatively connected in accordance with the control signal provided by the room temperature controller 54. In typical embodiments, the room temperature controller 54 receives a temperature sensing signal from the room temperature sensor 52 and compares it to the desired room temperature setpoint that is provided by the room setpoint device 53, which can be a potentiometer or keypad, for example.

In the embodiment shown, the spring return valve actuator 56 operates from a proportional control signal received from the room temperature controller 54 to automatically position the valve 62 from full closed to full open to maintain the desired room setpoint as provided by the room setpoint device 53. The room 51 air temperature is controlled by having air pass through a water coil 63 with an appropriate volume of hot or cold water to provide the necessary temperature differential between the water coil 63 temperature and the room 51 temperature to drive the room 51 temperature toward the desired room setpoint device 53. The water coil 63 uses hot or cold water that is provided by the central boiler and chiller system, for example, delivered by the water supply from the pump and piping system 60. Generally, each room has its own piping system. When it is desired to operate the systems in the heating mode, the water supply from the pump and piping system 60 provides hot water, from a boiler for example, and when it is desired to operate the system in the cooling mode, the water supply from the pump and piping system 60 provides cold water, from a chiller for example.

The outdoor air ventilation inlet 68 and outdoor air ventilation damper 67 are used to provide fresh air to the room. The volume of fresh air is controlled by the outdoor air ventilation damper controller 65 which mechanically positions the outdoor air ventilation damper actuator 66. There are a number of damper actuator control methods that are commonly used. With all methods there is a risk that cold outdoor air can freeze the water in the water coil 63 and cause significant property damage. Common outdoor air damper issues include damper blades that do not close tightly due to wear, warping, or other damage, loose or damaged mechanical linkages, and actuator failure.

Figure 2:
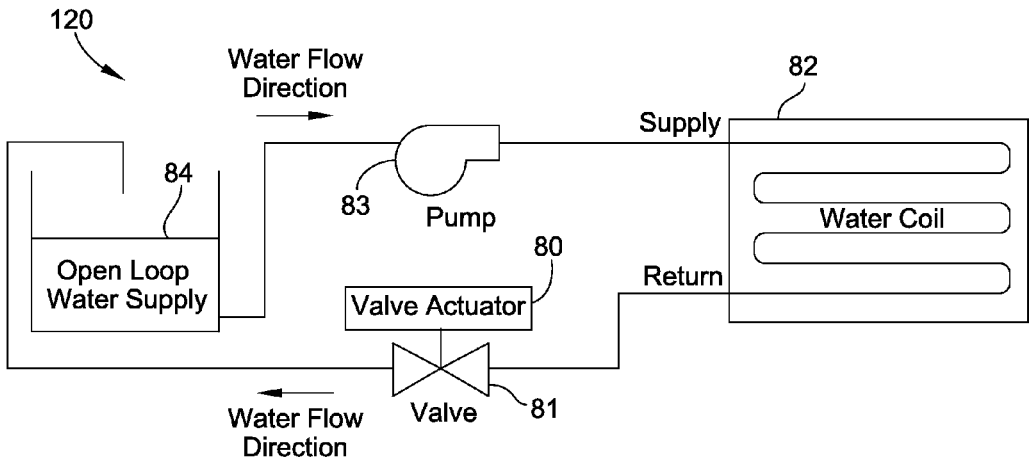
FIG. 2 is a schematic diagram of a prior art HVAC valve and coil locations for an open loop water system.
Figure 3:
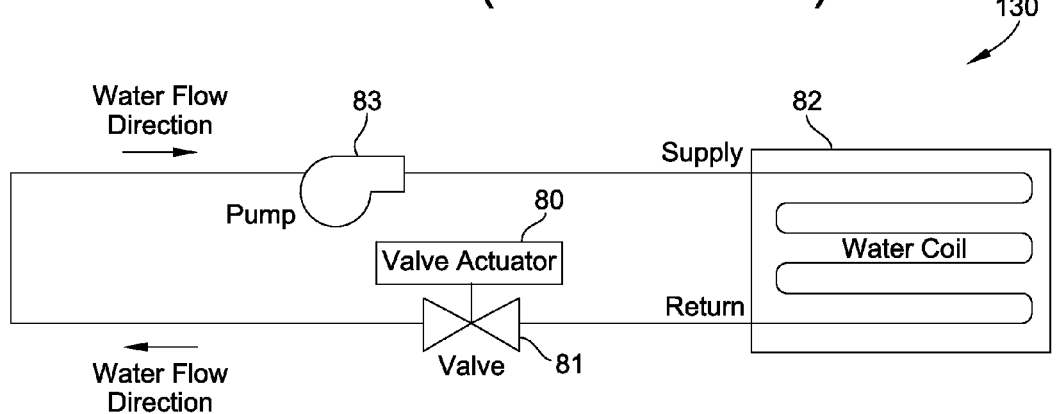
FIG. 3 is a schematic diagram of a prior art HVAC valve and coil locations for a closed loop water system with the valve on the return side of the coil.
Figure 4:
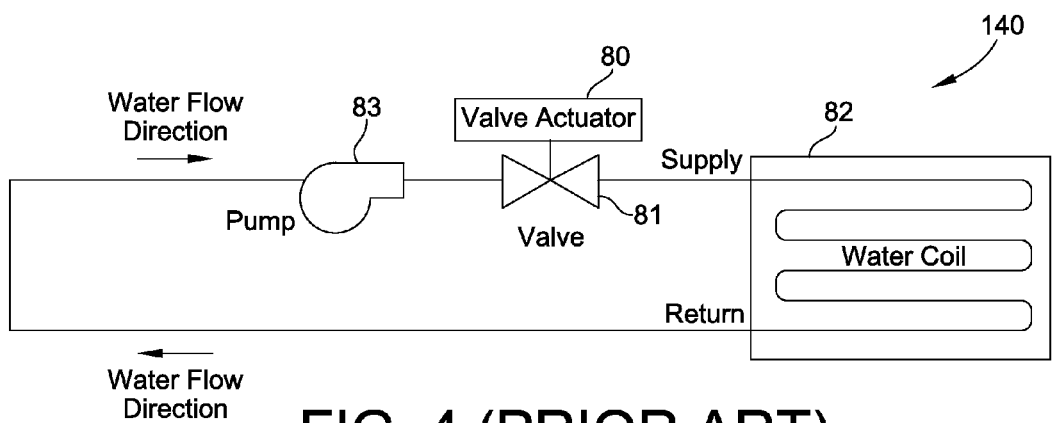
FIG. 4 is a schematic diagram of a prior art HVAC valve and coil locations for a closed loop water system for the valve on the supply side of the coil.

Piping systems can either be open loop systems 120, such as the one shown in FIG. 2, or closed loop systems 130, 140, like those shown in FIG. 3 and FIG. 4, respectively. With the open loop system 120 of FIG. 2 for example, the valve actuator 80 and valve 81 must be on the return side of the water coil 63, 82 to ensure that the water coil 82 tubes are full of water to obtain good heat transfer because open loop systems typically have a large amount of air in the system that can interfere with the heat transfer. With closed loop systems 130, 140, the valve actuator 80 and valve 81 can be on the return side of the of the water coil 82 as shown in FIG. 3 or can be on the supply side of the water coil 63, 82 as shown in FIG. 4.

Having the closed loop valve actuator 80 and valve 81 on the supply side of the of the water coil 63, 82, as shown in FIG. 4, will work but will have a higher probability of having air in the water coil 63, 82 that will interfere with the heat transfer. With the closed loop valve actuator 80 and valve 81 on the return side of the of the water coil 63, 82, as shown in FIG. 3, thermal transfer will be better with less air in the water coil 63, 82, but there is a higher risk of water in the coil 63, 82 freezing. This is because air is compressible, and systems with more air in the water coil 63, 82 are able to absorb some of the increased pressures resulting from a freeze condition due to the aforementioned compressibility of the air. Water in systems having less air in the water coil 82 are more prone to freeze conditions Not surprisingly, the probability of a coil freeze condition is most likely to occur in the heating mode because the outdoor air temperature is cold. For water in the water coil 63, 82 to freeze, there water therein must be somewhat stationary and exposed to cold temperatures for a period of time sufficient to lower the water temperature below 32° F. (0° C.). When the outdoor air temperature is very cold, the room temperature is likely to be cold and the valve at least partially open, which can reduce the possibility of a water coil freeze condition.

With milder outdoor air temperatures that are below 32° F. (0° C.) but not cold enough to necessarily cause the room 51 temperature to be uncomfortably cold, there can be a significant risk of water in the water coil 63, 82 freezing, since the valve 62 may be closed because the room 51 does not require heat such that the water in the water coil 63, 82 is not flowing, thus giving rise to a potential freeze condition.

With the conventional HVAC system 110 shown in FIG. 1, a freeze stat 59 is wired in series with the spring return valve actuator 56. When the freeze stat 59 detects a potential freeze condition, it will discontinue power to the spring return valve actuator 56, which, in some instances, has an internal spring mechanism to drive it to a known position upon loss of power. It is often the case that this known position is the fully open valve position, such that the valve 62 protects the water coil 63 and piping system from freezing, even if a lower volume of flow would be adequate to prevent the freeze condition. This approach tends to waste energy. In some cases, the freeze stat 59 may also provide power to the outdoor air ventilation damper actuator 66, which may also have spring return operation to close off the outdoor air ventilation damper 67 if the freeze stat 59 detects a potential freeze condition.

Freeze stats 59 are usually available with automatic reset or manual reset. After sensing cold air temperature, a manual reset freeze 59 stat remains open and provides full valve flow until the freeze stat 59 has been identified and manually reset. An automatic reset freeze stat 59 will automatically reset if the air temperature decreases below freezing and then warms up above freezing. This eliminates the need for the user to reset the freeze stat 59, but typically does not alert the user that there may be a problem with the outdoor air ventilation damper controller 65, outdoor air ventilation damper actuator 66, or outdoor air ventilation damper 67. The type of freeze stat 59 selected is generally based on the aforementioned trade-offs between the manual reset and automatic reset technologies. The manual reset freeze stat 59 requires the user to reset the device, which requires more labor and can waste energy before reset occurs, while the automatic reset freeze stat 59 requires less labor but can delay the identification of a damper-related problem that can cause future problems.

Still referring to FIGS. 1-4, the ability of the freeze stat 59 to properly protect the water coil 63 is dependent upon the proper installation of the freeze stat 59, the length of the freeze stat 59 relative to the area of the water coil 63, and any air movement stratification across the water coil 63 as a result of any outdoor air ventilation inlet 67 whose temperature may be improperly sensed by the freeze stat 59. Almost all building HVAC specifications require that there shall not be less than one lineal foot of freeze stat capillary length per square foot of water coil surface area.

In particular embodiments, the freeze stat 59 is mounted close to the water coil 63 in a symmetrical pattern that provides uniform coverage with equal spacing across the full length and width of the water coil 63. The freeze stat 59 typically would be located in the air stream at the output of the water coil 63 as shown in FIG. 1. Some systems may have a second water coil between the water coil 63 and the fan 58 and air ventilation output to the room 57 to provide both heating and cooling. These systems with two coils would have the freeze stat 59 located after the first water coil 63 typically used for heating and before the second coil typically used for cooling located before the fan 58 and air ventilation to the room 57. These systems with two coils would also have their necessary valve, valve actuator, manual balancing valve, water supply from the pump and piping system, and room temperature controller to provide sequenced operation with the thermal transfer provided by both water coils. While there are several other variations of coil configurations in systems with one, two, or more coils, the freeze stat 59 will not be located further downstream from the output of the closest coil located near the outdoor air ventilation damper 67 and outdoor air ventilation inlet 68.

The length of the freeze stat 59 capillary should be such that it allows proper representation of the water coil's full length and width, as too short a capillary will not properly cover the water coil 63, and too long a capillary will cause unequal representation from a non-symmetrical pattern. Generally, the freeze stat 59 capillary has to be carefully mounted using bends with minimum radius of 3" (76 mm) with support clips to avoid cracking the capillary which will cause eventual failure. Since the freeze stat 59 is only available with a few available capillary lengths this issue of matching the freeze stat length to the water coil area is a frequent occurrence. Many building HVAC specifications require a minimum element length of 25 feet (762 cm) with the capability of tripping if any one-foot (30 cm) section drops below the freeze stat setpoint in an attempt to obtain more accurate freeze protection.

The freeze stat 59 mounting with a symmetrical uniform pattern across the coil is based on the assumption that the air flow across the water coil 63 is consistent throughout its full length and width. In reality this may not be true if air stratification exists due to the angle or pattern of the outdoor air ventilation damper 66 blades, outdoor wind turbulence, or wind gusts caused by the shape of the building and adjacent buildings and objects and direction of the wind. Typically, the freeze stat 59 is designed to sense the average temperature throughout its capillary and trigger its two-position relay output in the event that the temperature is too cold, but does not fully compensate for a large degree of stratification causing sections of the water coil 63 and the freeze stat 59 capillary to be at different temperatures.

It is desirable to provide art apparatus to overcome the sensing problems highlighted above and to also provide installation savings by having fewer components to purchase, mount, wire, and test than with the traditional HVAC systems. The conventional systems, such as that shown in FIG. 1, operate under the assumption that the water coil 63 temperature always follows the nearby air temperature and that the freeze stat 59 accurately senses the air temperature. A short duration cold temperature can force the freeze stat 59 to sense a cold temperature even if the water temperature is above freezing causing a false freeze condition and wasting energy. Some HVAC design engineers try to minimize false freeze detection with limited success by adding time delay relays with delays of 0.5 to 5 minutes to prevent spurious freeze stat trips.

An inaccurate freeze stat 59 with a low side sensing error can also prematurely force the valve full open if the water is above freezing and waste energy especially with a manual reset freeze stat that may stayed tripped for a long period of time until it is manually reset. Conversely, an inaccurate freeze stat 59 with a high side sensing error can incorrectly fail to sense a true freeze condition resulting in extensive water coil 63 and building damage. Most freeze stats have field adjustable trip point settings, and are not always properly set to represent a freeze condition. Some HVAC engineers specify a trip setpoint of 38° F. (3° C.) with the assumption that the freeze stat 59 capillary temperature follows the water temperature and that a 38° F. (3° C.) setting will protect the coil and not trip too early.

An alternate approach to achieving freeze protection in HVAC coils 63 in closed loops is the addition of an anti-freeze to prevent the rigid pipes and coils from undergoing physical stresses, deformation, and rupture due to the expansion that occurs when water turns to ice. Compounds are added to the water to reduce the freezing point of the mixture below the lowest temperature the system is likely encounter. The most frequently used antifreeze compounds for HVAC closed loop systems are ethylene glycol and propylene glycol. One of the most important characteristics of glycol is its viscosity because of its influence on the ease of pumping and its impact on heat transfer. Viscosities of glycols vary inversely with temperature. Hot glycols flow freely, but their viscosities increase as they cool until they eventually set and no longer flow. Glycol water mixtures are more viscous than water alone and their viscosities become greater as the glycol content is increased, or if the water mixture temperature is lowered.

Ethylene glycol has a lower cost, lower viscosity, and better heat transfer properties than propylene glycol. However, ethylene glycol is not as environmentally friendly as propylene glycol due to its moderate toxicity. The proper concentration of glycol to water is required to obtain the desired freeze protection level with higher concentrations of glycol by volume lowering the freezing points of the system.

Figure 5A:
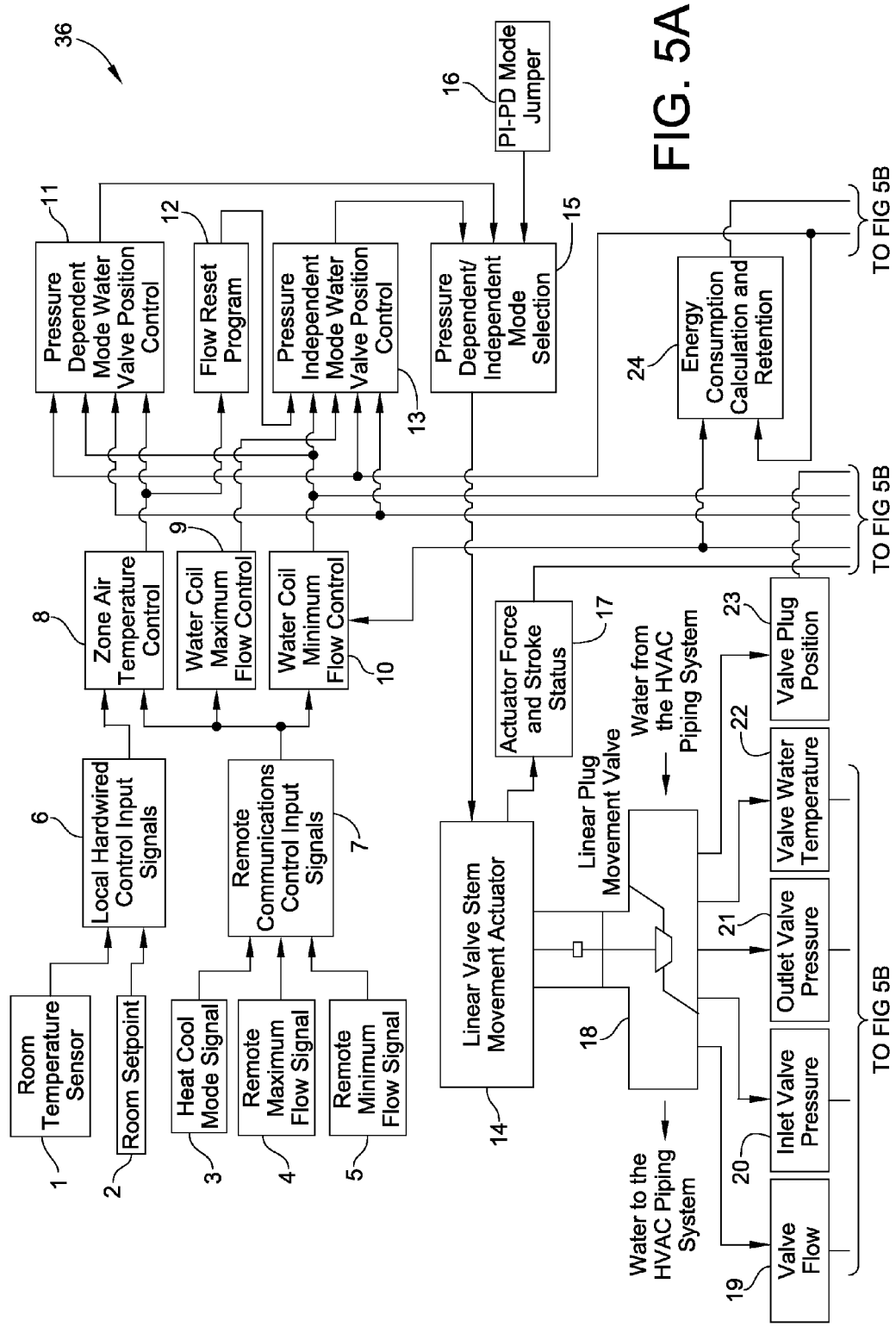
FIGS. 5A and 5B are schematic block diagrams of an HVAC system and integrated valve and actuator assembly, constructed in accordance with an embodiment of the invention.
Figure 5B:
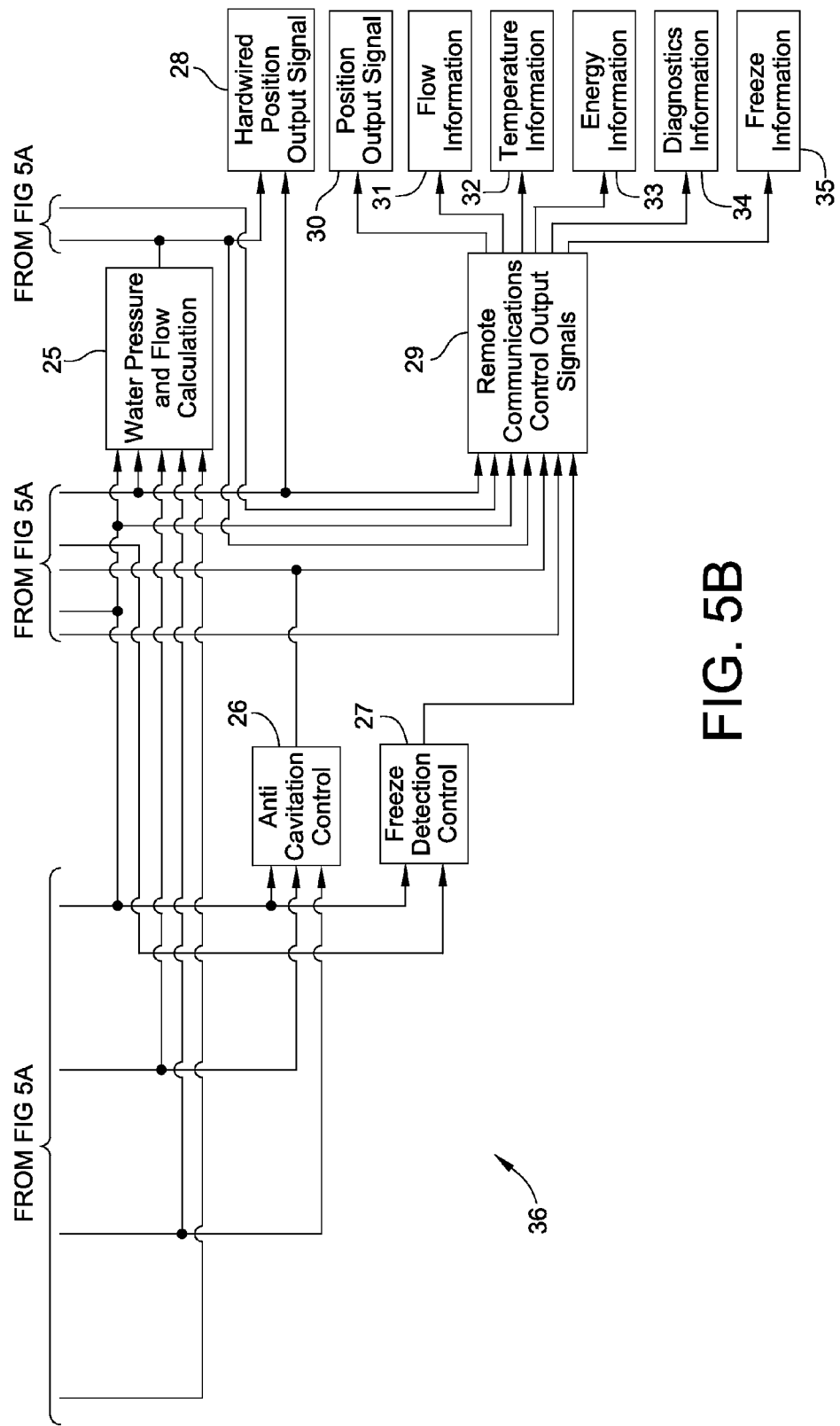

The schematic diagrams of FIGS. 5A and 5B, which will be described below, illustrate various improvements over the prior art. In accordance with an aspect of the invention illustrated in the schematic diagram of FIGS. 5A and 5B, a valve and actuator assembly 36 includes a valve 18, a linear valve stem movement actuator 14, a room temperature controller 8, a water temperature sensor 22, a flow rate sensor 19, and freeze detection controller 27 in one integral assembly that is much faster to install because only one device has to be mounted and wired, rather than multiple separate devices, as with the system 110 of FIG. 1. The embodiment of FIGS. 5A and 5B also show that the valve 18 includes and inlet valve pressure sensor 20 and an outlet valve pressure sensor 21 so that the pressure drop across the valve 18 can be obtained. FIGS. 5A and 5B show the invention with the valve and actuator assembly 36 with integral freeze protection having the entire functionality of several traditional devices, all requiring individual mounting and inter-connective wiring. The valve and actuator assembly 36 can be field-configured to operate as a pressure-dependent or a pressure-independent valve, and will provide energy-efficient freeze protection in either valve control mode.

Pressure-dependent control valves are selected primarily on pressure drop through the coil, valve flow coefficient factor, and close-off rating. The valve flow coefficient factor is the measurement of flow expressed by the term Cv which is defined as one US gallon (3.8 liters) of 60° F. (15.6° C.) water during one minute with a one psi (6.9 kPa) pressure drop. A valve's rated Cv is taken when it is fully open, and will vary when the valve plug is at other positions. At a particular valve plug position the flow rate of the pressure dependent valve changes based on the differential pressure across the valve (which varies with the pump curve and interaction of the other valves in the system).

The Cv can be expressed mathematically as:

$$Cv = \frac{GPM}{\sqrt{\Delta P}} = GPM \sqrt{\frac{SpecificGravity}{\Delta P}}$$

Cv=Coefficient of Flow
GPM=US gallons per Minute at 60° F., 15.6° C.
ΔP=Differential pressure in PSI
SpecificGravity=Specific Gravity of the Fluid In the International System of Units the Cv is expressed as the Kvs which is defined as the flow in cubic meters per hour (m3/h) of 15.6° C. water with a pressure drop of 100 kPa (1.0 Bar) with the valve fully open, and can be expressed mathematically as:

$$Kvs = \frac{m3/h}{\sqrt{\Delta P}} = m3/h \sqrt{\frac{SpecificGravity}{\Delta P}}$$

Kvs=Coefficient of Flow
m3/h=Cubic meters/hour at 15.6° C.
ΔP=Differential pressure in Bar (1 Bar=100 kPa)
SpecificGravity=Specific Gravity of the Fluid The specific gravity of a liquid is the ratio of the density of the liquid compared to the density of pure water at 39° F., (4° C.). Specific gravity is a ratio which has no units. A liquid with a specific gravity less than one will float in water because its density is less than the density of water. Conversely a liquid with a specific gravity greater than one will sink in water because its density is greater than the density of water. Ethylene and propylene glycol water mixtures have specific gravities of greater than one and therefore have a density greater than water.

It should be recognized that while, in many instances primarily for exemplary purposes, it is specified that water is the liquid flowing through the valves and valve actuators of a particular embodiment, alternate embodiments may be employed to control the flow of liquids other than water. It is envisioned that fluid flow systems for oils, various chemicals, or even beverages could benefit from various features and aspects of the invention. For those embodiments of the invention provided below in which various components are described with respect to their use in water-based fluid control systems, alternate embodiments of the invention are envisioned for use in non-water-based fluid control systems.

When the liquid flows through a valve, it accelerates in the valve's restricted flow path which results in a decrease in pressure. The liquid reaches its highest velocity at a point called vena contracta. The fluid is at its lowest pressure and highest velocity at the vena contracta. As the liquid exits the valve some of the pressure loss is recovered as the liquid decelerates. As a consequence, the pressure in the valve may be lower than the downstream pressure. If the pressure in the valve drops below the vapor pressure of the liquid, it will start to vaporize. This condition, known as cavitation, will result in a lower flow rate than calculated in the Cv and Kv formulas above because when cavitation bubbles form in the vena contracta, the vapor bubbles will increasingly restrict the flow of liquid until the flow is choked with vapor. This condition is known as choked or critical flow. When the flow is fully choked, the flow rate does not increase when the pressure drop is decreased.

When cavitation occurs, the liquid in the valve rapidly converts to a vapor and then experiences a pressure recovery to some pressure above the vaporizing pressure causing an implosion or collapse of the vapor bubbles. This can result in mechanical corrosion or pitting damage to the valve components immersed in the liquid, breakage of the valve components due to extreme vibration, and detectable noise in the valve. The valve components most at risk for cavitation damage are valve plugs and seats that have parallel running surfaces. The mechanical pitting and corrosion will vary with various valve material compositions. Cavitation occurs when the vapor pressure is more than the vena contracta pressure, but less than the outlet pressure. When the vapor pressure is less than the vena contracta pressure, there is full liquid flow with no cavitation.

Figure 11:
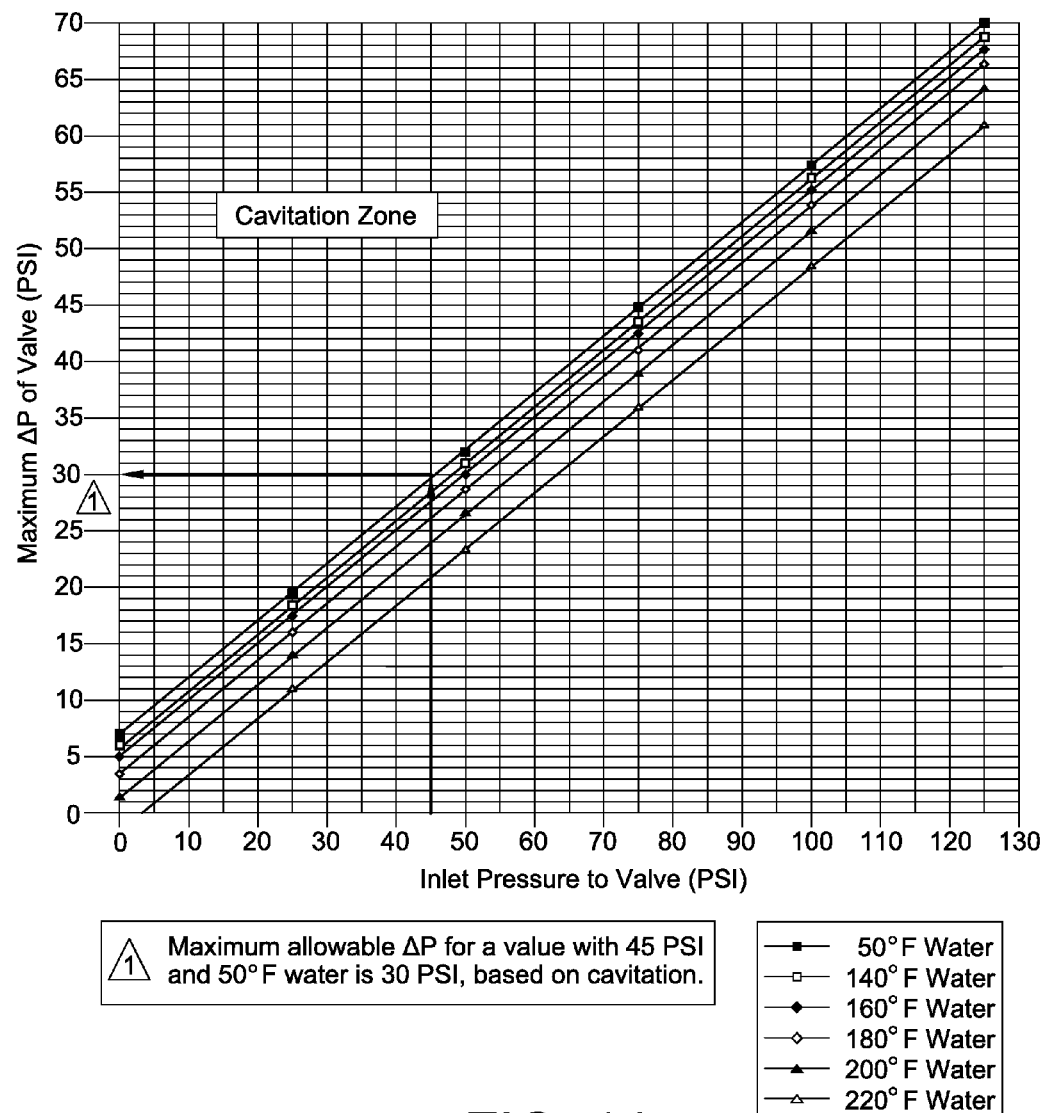
FIG. 11 is a graphical illustration of a cavitation zone water temperature relationship, in accordance with an embodiment of the invention.

The maximum allowable pressure differential across a valve that is possible without a cavitation condition depends upon the temperature of the liquid, because the vapor pressure of the liquid varies with the liquid temperature. For example, when water is in a confined closed container, an equilibrium exists between the water and its gaseous state. The vapor pressure does not depend on the amount of water. The boiling point is the temperature where the vapor pressure reaches the atmospheric pressure, which varies with the altitude. Since the vapor pressure of water increases with water temperature, with warmer water the cavitation condition occurs at lower differential pressures than with cool water, as shown in FIG. 11. For example, the maximum allowable differential pressure without cavitation for a valve with a 45 psi (310 kpa) inlet pressure and 50° F. (10° C.) water temperature is 31 psi (214 kpa). With the same 45 psi (310 kpa) inlet pressure and with a 220° F. (104° C.) water temperature the maximum allowable differential pressure without cavitation drops to 21 psi (145 kpa).

Vapor pressures vary with the type of liquid. Although different liquids have vapor pressures that all generally increase as the temperature increases, and which decrease as the temperature decreases, the rate of change, as well as the boiling point, varies with each liquid. Glycols have lower vapor pressures than water and their boiling points are above the boiling point of water. At 68° F. (20° C.), the vapor pressure of water is more than 100 times as great as that of propylene glycol. The vapor pressure of systems containing a mixture of ethylene glycol or propylene glycol and water will be different than the vapor pressure of systems with just water. Further, the vapor pressures will vary with the concentration volume of ethylene glycol or propylene glycol relative to the water in the system. Water systems using a glycol water mixture rather than just water will have different cavitation points as a result of their different vapor pressures.

Most conventional pressure-independent valves consist of mechanical pressure control valves connected in series with electronic control valves, but embodiments of the invention disclosed herein include all-electronic design units consisting of one electronic control valve with additional system sensors, which, when compared to conventional valve systems, feature higher accuracy, an ability to provide additional features, and better reliability because they have fewer moving parts to fail.

Figure 12:
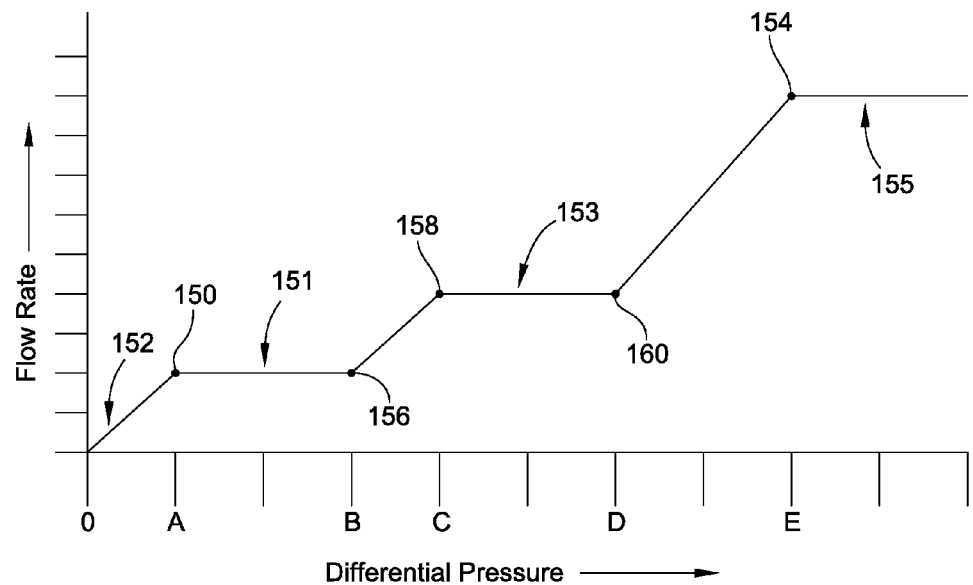
FIG. 12 is a graphical illustration showing independent flow control operation typical of prior art systems.
Figure 13:
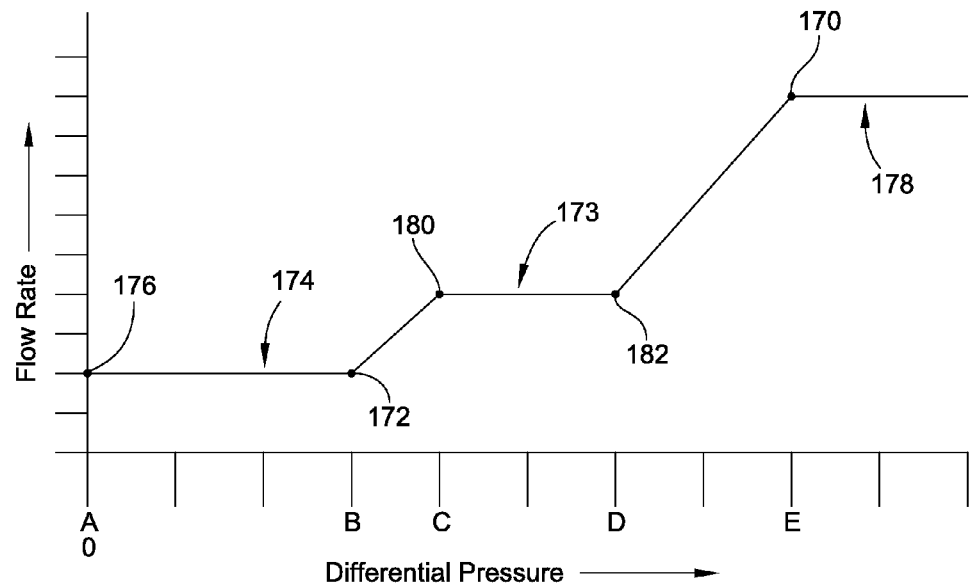
FIG. 13 is a graphical illustration showing independent flow control operation for systems constructed in accordance with an embodiment of the invention.

Referring to FIGS. 12 and 13, it can be seen that all pressure-independent valves require a maximum flow rate to match the controlled coil or load, as shown by the flow rate beginning at Point E (along the x-axis) 154, 170 in both figures. The maximum flow rate will be maintained irrespective of the valve's commanded position and the pressure differential across the valve. The maximum flow rate of a mechanically operated pressure-independent valve can be setup by the valve manufacturer during the valve's assembly, or manually changed in the field at the pressure-independent valve. However, the maximum flow rate cannot generally be changed from a remote location to save money by adjusting to seasonal water temperature changes, or by maintaining the most energy-efficient temperature differentials to reduce the pump's electrical consumption and operate the chillers and boilers at their most efficient operating levels. Generally, the initial maximum flow setting for a standard pressure-independent valve is chosen to match the rating of the water coil.

FIG. 12 is a graphical illustration showing independent flow control operation typical of prior art systems. As can be seen from FIG. 12, there is no minimum flow rate setting to obtain freeze protection or to maintain a minimum temperature differential. When a valve is open, the water temperature at the valve inlet and outlet are the same. For example, if a cooling system valve is open, the temperature differential across its valve is zero. The temperature differential is across the coil because it is designed for heat transfer, constructed of thermally conductive materials, and typically has a fan blowing air across it. The temperature differential across a water cooling coil does not fully represent the energy transferred because cooling involves both sensible heat and latent heat (condensation). The temperature differential across a water heating coil does represent the energy transferred because water heating only involves sensible heat.

On the horizontal axis, a Point A 150 shows the flow and differential pressure at which the pressure flow control portion of the valve is functional (for mechanical pressure control units only). A Point B 156 is the point at which the valve actuator is commanded to open further. A first flow rate level 151 between Point A 150 and Point B 156 is the flow rate for a first fixed valve plug position (somewhere in the middle of the stroke) with an increasing differential pressure. A second flow rate level 153 between a Point C 158 and a Point D 160 is the flow rate for a second fixed valve plug position (somewhere in the middle of the stroke) with an increasing differential pressure. Point D 160 also represents the point at which the valve actuator is commanded to fully open. A Point E 154 shows the differential pressure and a third flow rate level 155 at which the valve is limited by its maximum flow limit because the valve actuator is commanded to its fully open position.

FIG. 13 is a graphical illustration showing independent flow control operation for systems constructed in accordance with an embodiment of the invention. As can be seen from FIG. 13, embodiments of the present invention allow for a minimum flow rate 174 to obtain freeze protection or to maintain a minimum temperature differential. In particular embodiments, this minimum flow rate 174 can be set locally or remotely. Further, this minimum flow rate 174 may be adjustable, locally or remotely, down to zero regardless of the valve actuator's commanded position. A Point B 172 is the point at which the linear valve stem movement actuator 14 (shown in FIG. 5A) is commanded to open further. A second flow rate level 173 between a Point C 180 and a Point D 182 is the flow rate for a second fixed valve plug position (somewhere in the middle of the stroke) with an increasing differential pressure. Point D 182 also represents the point at which the valve actuator 14 is commanded to fully open. A Point E 170 shows the differential pressure and flow rate for a maximum flow rate level 178 at which the valve 18 (shown in FIG. 5A) is limited by its maximum flow limit, because the linear valve stem movement actuator 14 is commanded to its fully open position. The maximum flow rate level 178 can be adjusted locally or remotely to save energy in two-pipe water temperature changeover system.

Adjustments can also be made for energy synchronization between chillers and boilers, to compensate for piping and coil degradation, and to prevent coil overflow and maintain energy-efficient temperature differentials. Typically, chillers and boilers operate at their most efficient (i.e., the operating point at which each unit of cooling or heating, each BTU for example, is provided at the lowest cost) when they operate at their designed input temperature to output temperature differential. This differential may be defined as return water temperature minus supply water temperature for a chiller, and as supply water temperature minus return water temperature for a boiler. The linear valve stem movement actuator 14 of FIG. 5A can automatically decrease the maximum flow setpoint, or increase the minimum flow setpoint, if the chiller or boiler have a low temperature differential as a result of too few zones requiring cooling or heating. Coil overflow is a condition where the water velocity through a valve is too great, resulting in a decrease in the thermal transfer efficiency and an increase in the cost of energy to operate the system.

A pressure-independent valve fixed high flow limit works adequately if all of the system's device selections and installations have been properly completed, and if no load adjustments are required. However, any adjustments made after the installation of a mechanically-operated pressure-independent valve are very time-intensive, as each valve has to be directly accessed to identify and/or change its flow settings. Additionally, as the system's piping system and coils degrade internally and externally due to debris, corrosion, and possibly mechanical damage, the original fixed high flow limit may no longer match the system and, for the reasons described above, cannot be easily changed.

Mechanically-operated pressure-independent valves do not offer a minimum flow rate, as shown in the graphical illustration of FIG. 12 by the flow rate and differential pressure represented by Point A 150. Mechanical pressure-independent valves have a minimum pressure differential across the valve's inlet to outlet before the valve will operate in their pressure-independent mode, as shown by the flow rate ramp 152 between zero flow and Point A 150. This flow rate ramp 152 between zero flow and Point A 150 is not the minimum flow rate, because it is directly affected by the valve's commanded position from its input signal and by the pressure across the valve's inlet to outlet.

There are times when a minimum flow rate would be valuable to assure that there is adequate flow to protect and keep the other mechanical equipment in the system operating efficiently. Between Point A 150 and the flow rates and differential pressures represented by Point E 154 in FIG. 12, and by Point B 156, Point C 158, and Point D 160, the valve will vary its flow based on its commanded position and will maintain that flow irrespective of the pressure differential across the valve.

In embodiments of the invention, the valve and actuator assembly 36 provides both high (maximum flow rate) as shown in Point E 170 of FIG. 13 and either one or two independent low (minimum flow rate) pressure-independent valve flow operating settings with edit capability locally at the valve and remotely via an open protocol bus. The flow rate settings can be manually or automatically changed on a seasonal basis to adjust for weather conditions, used on a load shed situation to curb a peak power electrical surcharge, used to prevent coil overflow to save energy, used to provide low energy pipe and coil freeze protection, used for servicing and periodic load adjustments, and other applications. Between Point B 172 and Point E 170 in FIG. 13, the valve will vary its flow based on its commanded position and will maintain that flow irrespective of the pressure differential across the valve.

Most, if not all, conventional pressure-independent valves have fixed maximum flow settings that can only be locally set or identified at the valve. To identify the current setting, the valve has to be accessed, and the setting can only be changed at the valve. Since a commercial building may have hundreds or thousands of valves, making adjustments of this type to groups of valves can require extensive time and effort to access all of the units.

However, as explained fully herein, embodiments of the present invention provide several unique features not typically available in conventional valve and actuator systems. These features include, but are not limited to:

1) Remote access to identify the high flow settings on individual valves or groups of valves to intelligently re-tune the building;
2) Remote access to change the high flow settings on individual valves or groups of valves to intelligently re-tune the building to prevent coil overflow and to efficiently implement heating/cooling seasonal changeover adjustments; and
3) A low flow rate with local and remote access capability to identify and change the flow rate setting. This low flow rate can be synchronized with the building's chillers and boilers to assure a minimum load to enable them to operate at their most efficient loading point to lower both electrical and natural gas consumption. It can also be used to automatically protect the pipes and coil system from a freeze condition while maintaining a low energy-efficient flow, and to eliminate the need for separate freeze protection devices.

Pressure-independent valves are generally selected based on the maximum design flow rate of the coils they are being used to control. Pressure-independent valves provide a constant flow volume with a particular control input signal irrespective of the differential pressure. Typically, this is accomplished either by use of an internal differential pressure controller or by measuring the flow volume and automatically adjusting the valve plug to maintain a constant flow volume. Pressure-independent valves provide this constant flow volume over a defined differential pressure range. They also have a maximum flow rate that limits the flow if the valve's control signal commands it to its full open position.

In particular embodiments, pressure-independent valves increase energy efficiency by allowing the pump's variable frequency drive (VFD) to run at its lowest possible speed to satisfy the demand of the system. These valves may also minimize interaction with other valves, and lower installation costs because manual flow balancing is simplified and commissioning time significantly reduced. Further, pressure-independent valves may increase the efficiency of the chiller/boiler system by maintaining a more constant temperature drop across the coils. Pressure-independent valves can also act as automatic balancing valves by providing a constant control input signal to the control valve, or by providing the maximum control input signal when the valve's maximum rated flow matches the required balancing flow rate.

In a particular embodiment of the invention, the valve and actuator assembly 36 includes valve 18, linear valve stem movement actuator 14, room temperature controller 8, water temperature sensor 22, flow rate sensor 19, inlet and outlet pressure sensors 20, 21, valve plug position sensor 23, and freeze detection controller 27 in one integral assembly. In more particular embodiments, the valve and actuator assembly 36 can be configured by the user for either pressure-dependent (PD) or pressure-independent (PI) valve control. In certain embodiments of the invention, the valve and actuator assembly 36 is configured to provide pressure-dependent or pressure-independent control using a separately connected temperature controller rather than an internal temperature controller.

In a particular embodiment, field selection between pressure-dependent and pressure-independent via jumper switch, for example, by selecting the desired mode on PI-PD mode jumper 16, shown in FIG. 5A. In some embodiments, the valve and actuator assembly 36 receives signals from the room temperature sensor 1 and room setpoint device 2, and determines whether there is a requirement to open or close the linear plug movement valve 18, based on the difference between the room temperature sensor 1 and room setpoint 2. The linear plug movement valve 18 is mechanically positioned by the linear valve stem movement actuator 14, which receives its signal from PI-PD mode selection device 15. The linear plug movement valve 18 has a plug that is movable along the longitudinal flow axis of the valve port positioned between its inlet passageway and outlet passageway. The linear plug movement valve 18 includes a stationary sealing port, or valve seat, and a generally cylindrically-shaped outer plug that travels in a linear plane from the stationary sealing port upward toward its maximum open position, which is limited by the opposite linear plug movement valve 18 outer wall for pressure-dependent operation, or by the valve and actuator assembly 36 with integral freeze protection electronically controlled position for pressure-independent operation.

The linear valve stem movement actuator 14 can be set for sensitive or less sensitive control with a deadband setting to prevent overshoot in water systems that are oversized relative to the controlled area. The PI-PD mode selection device 15 utilizes either a pressure-dependent or pressure-independent control algorithm depending upon the position of the PI-PD mode jumper 16. When the valve and actuator assembly 36 with integral freeze protection is setup for a pressure-dependent valve operation from the PI-PD mode jumper 16, the pressure dependent/independent mode selection device 15 receives its signal from the pressure-dependent mode water valve position controller 11.

Figure 7:
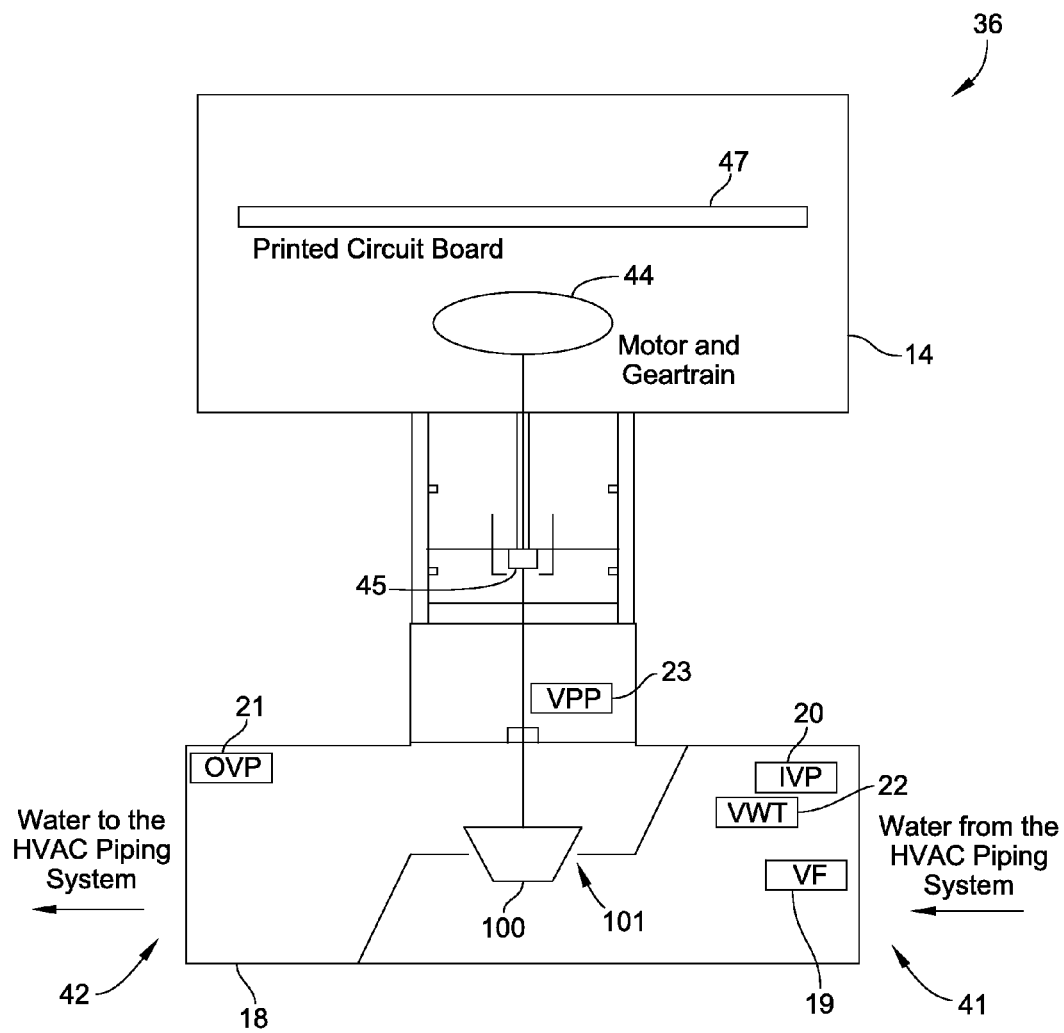
FIG. 7 is a physical diagram of the new art design contained in an integrated package.

FIG. 7 is a schematic diagram of the valve and actuator assembly 36 configured with integral freeze protection, in accordance with an embodiment of the invention. The valve and actuator assembly 36 includes the valve 18 with valve plug 100, which seats in valve seat 101. The valve 18 further includes flow rate sensor 19, an inlet 41, which receives water or a water mixture from the HVAC piping system, with inlet pressure sensor 20, and an outlet 42, which supplies water or a water mixture to the HVAC piping system, with outlet pressure sensor 21. The valve 18 also has a water temperature sensor 22 and a plug position sensor 23.

The valve plug 100 position is controlled by the linear valve stem movement actuator 14, which positions the valve plug 100 using a motor and geartrain 44 coupled to the valve plug 100 via a linkage assembly 45. The linear valve stem movement actuator 14 further includes a circuit board 47, which in particular embodiments, contains circuitry for the various controllers, control modules, and network communications modules described herein and shown schematically in FIGS. 5A and 5B.

Figure 8:
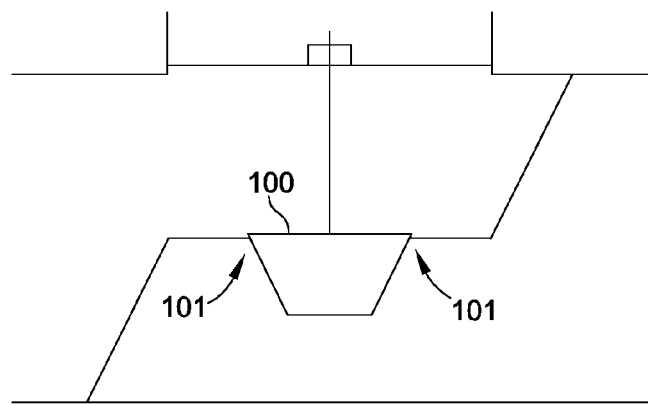
FIG. 8 is a schematic diagram showing the valve plug closed, in accordance with an embodiment of the invention.
Figure 9:
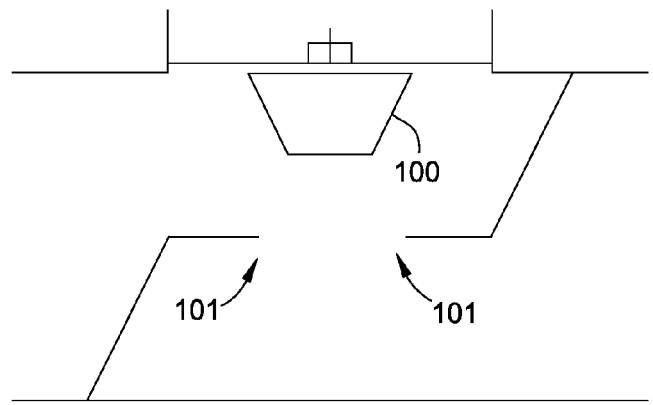
FIG. 9 is a schematic diagram of the valve plug open for pressure dependent control, in accordance with an embodiment of the invention.
Figure 10:
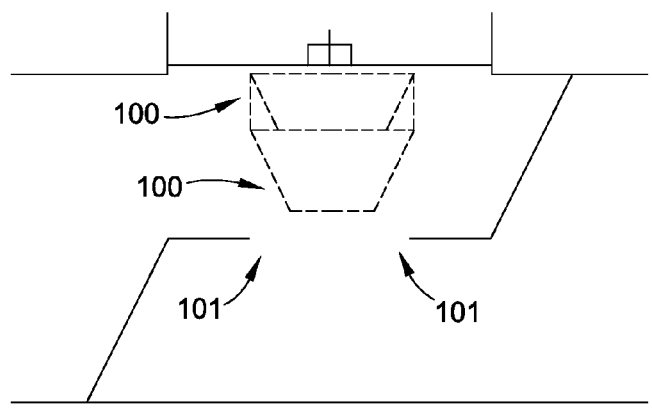
FIG. 10 is a schematic diagram of the valve plug open for pressure-independent control, in accordance with an embodiment of the invention.

FIGS. 8-10 are schematic representations showing various modes of operation for the valve plug 100. Specifically, FIG. 8 shows the minimum-flow or closed position of the linear plug movement valve's plug 100. This shows the position of the valve plug 100 when fully closed against the valve seat 101. In this position, there is no flow except possibly a very small amount of leakage through a possible small gap between the valve plug 100 and the seat 101. The minimum-flow or closed position of the valve plug 100 for the linear plug movement valve 18 is relevant for both pressure-dependent and pressure-independent valve operation.

Piping systems between the heating and cooling source, such as from a boiler or chiller and the pumps, can be either direct return or reverse return. In a direct return system, the length of pipe in the system varies for each of the branches or loops. These different lengths create different branch differential pressures within each loop. The different branch differential pressures, in turn, cause different fluid flows through the same size valves when their plugs are in the same position. This unbalanced condition requires manual balancing between the different branch circuits so that each of the valves has the equal ability to obtain more or less heating and cooling fluid volume to control the temperature. The manual balancing is usually achieved by restricting the flow in the branch circuits that have lower pressure, by means of an adjustable valve in series with the branch. In a reverse return system, the piping lengths are designed to be equal in length for each branch circuit. The equal pipe lengths allow the differential pressures within each loop to be equal, and eliminate the need for balancing the circuits. Systems with direct return piping benefit more from pressure-independent valve control than systems with reverse return piping because of their inherently larger variations between the system's branch circuits.

When the PI-PD mode jumper 16 is setup for pressure-dependent valve operation, the maximum-flow position of the valve plug 100 is fully open as shown in FIG. 9, such that the flow volume will vary with the differential pressure across the valve. When the PI-PD mode jumper 16 is setup for pressure-independent operation, the maximum-flow position of the valve plug 100 will vary, as shown in FIG. 10, and is controlled by the pressure-independent mode water valve position controller 13, based on the remote maximum flow signal 4, regardless of the temperature difference between the room temperature sensor 1 and the room setpoint device 2. Maximum flow is maintained in the pressure-independent mode because the flow rate needs to be limited to allow adequate time for the water or water glycol mixture to be in the coil to provide proper heat transfer.

Although aspects of the invention have been described with respect to some preferred embodiments, those skilled in the art will recognize that changes may be made in form and detail without departing from the scope and spirit of the invention. For example, fluid control valves can have linear motion plug travel, such as with a globe valve or gate valve, or can have angular rotation plug travel, such as with a ball valve, butterfly valve, or shoe valve. As a further example, actuators are available with an unpowered position of fail in place, often referred to as non-spring return. Other actuators are available with an unpowered preset position, often referred to as spring return. Non-spring-return-type actuators remain in their last commanded position upon loss of power. Spring-return-type actuators utilized a mechanical spring or electrical capacitor or battery along with a power-loss detection circuit to detect the loss of power and then position the actuator to a preset position until power to the actuator is restored. Embodiments of the invention may include, but is not limited to, any of the aforementioned valve and actuator types, including the linear plug movement valve 18 and the linear valve stem movement actuator 14.

In the embodiment of FIGS. 5A and 5B, the valve and actuator assembly 36 includes a valve flow rate sensor 19, an inlet valve pressure sensor 20, an outlet valve pressure sensor 21, a valve plug position sensor 23, an anti-cavitation control module 26, and an energy consumption calculation and retention module 24. The valve and actuator assembly 36 with integral freeze protection is suitable for use with a variety of flow rate sensors 19 and a variety of pressure sensing technologies. These include, but are not limited to: 1) differential pressure; 2) positive displacement; 3) velocity; and 4) mass flow.

The operation of differential pressure sensors is based on the premise that the pressure drop across the valve is proportional to the square of the flow rate. Typically, the flow rate is obtained by measuring the pressure differential and extracting the square root.

This requires a primary element to cause a kinetic energy change (e.g., constriction in the line to create a difference in upstream and downstream pressures), and a secondary element to measure the differential pressure. Available differential pressure sensors include, for example, orifice plate sensors, venturi tube sensors, flow tube sensors, flow nozzle sensors, pitot tube sensors, elbow tap sensors, target, variable-area sensors (rotameter), annubar sensors, and v-cone sensors.

Positive displacement sensors divide the liquid into specific discrete increments and move it on. The total flow is an accumulation of the measured increments and is usually a series of counts that are tallied over a period of time and stored into a register. Available positive displacement sensors include reciprocating piston, oval gear, nutating disk, rotary vane, and helix.

Velocity sensors operate linearly with respect to the volume flow rate, and are available using several different technologies including turbine sensors, vortex shedding sensors, swirl sensors, conada effect & momentum sensors, exchange sensors, electromagnetic sensors, ultrasonic sensors, Doppler sensors, and transit-time sensors.

Mass sensors measure the mass rate of the flow directly as opposed to the volumetric flow with various designs available including calorimetric (thermal dispersion) sensors, coriolis sensors, and thermal sensors.

In certain embodiments of the invention, the valve and actuator assembly 36 with integral freeze protection is configured to operate in a stand-alone non-communicating mode with total localized control, while in alternate embodiments, the valve and actuator assembly 36 with integral freeze protection includes a network communications module, and is configured to operate in a communicating network that allows information to be sent and received by the valve and actuator assembly 36 in order to synchronize its operation with the building management system (BMS) and with other HVAC equipment (e.g., heating, cooling, pumping systems) in the building to provide diagnostic and energy data for remote monitoring, alarming, and data retention. The network communications module may include, for example, a remote communications control input signal device 7 and a remote communications control output signal device 29.

The remote communications control input signal device 7 receives relevant valve and HVAC coil system data from the building management system (BMS) via a serial communication bus including the heat cool mode signal 3, remote maximum flow signal 4, and remote minimum flow signal 5. These signals allow the valve and actuator assembly 36 with integral freeze protection to be synchronized with the BMS and the building's mechanical heating, cooling, and pumping systems to increase energy efficiency of the building's HVAC system. These signals are retentively stored in the remote communications control input signal device 7 such that the operation of the valve and actuator assembly 36 with freeze protection can be adapted for the HVAC mechanical piping system in a stand-alone mode or in a communicating network mode. The retentively stored signals also allow for proper operation in a communicating network mode if for any reason communications to the BMS network are lost.

Figure 6:
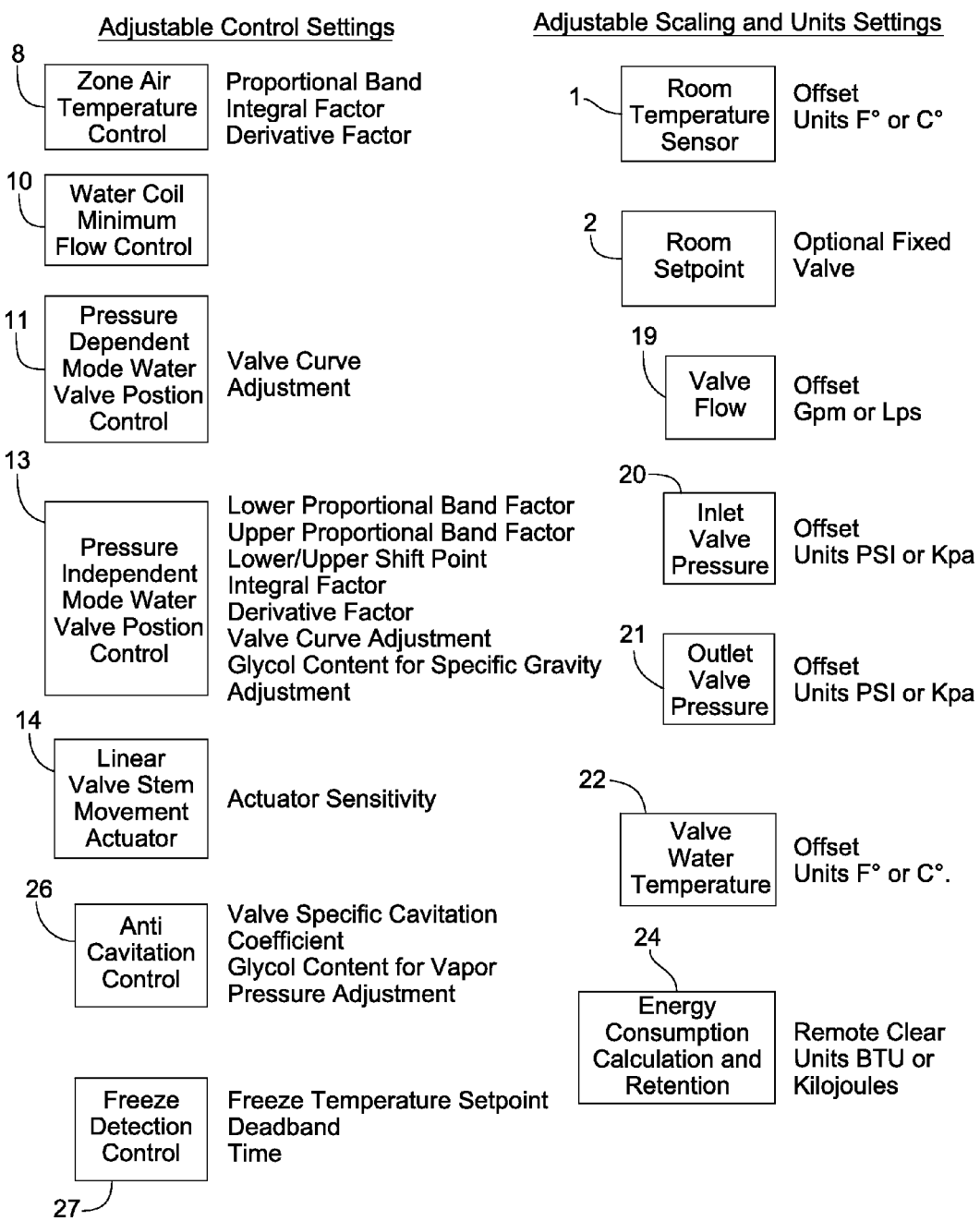
FIG. 6 is a block diagram illustrating adjustable setting for the integral valve and actuator assembly, according to an embodiment of the invention.

For stand-alone operation, the remote communications control input signal 7 values can be edited with a software programming tool that is initially used to establish the valve and actuator assembly 36 with integral freeze protection settings, but is not required to be left with the valve and actuator assembly 36. The software programming tool is also used to initially adjust operating parameters that are used for the valve and actuator assembly 36 basic operation, as shown in FIG. 6, for both the stand-alone and network communication modes. The adjustable operating parameters, shown in FIG. 6, have default settings that are preset to values that provide stable control for typical HVAC water systems, such that the valve and actuator assembly 36 with integral freeze protection will work reasonably well with all systems without adjustment. The optional adjustments will allow users to customize behavior of the valve and actuator assembly 36 to better work with the building management system if it is desired to further optimize the valve and actuator assembly 36 to match the unique HVAC conditions of the building.

Some of the adjustable operating parameters, shown in FIG. 6, are for the optional calibration of input sensors by means of changing an offset value, with a default setting of zero, to a positive or negative number to negate any error, if it is determined by an optional independent test measurement that an input sensor does not match another calibrated measurement. Other adjustable operating parameters, shown in FIG. 6, include selection of units for operation in different countries, and for the selection of different units for temperature, pressure, flow, and energy calculated values.

The pressure-dependent mode water valve position controller 11 receives inputs from the water pressure and flow calculation module 25 which provides the volume of water flowing through the valve, from the water coil minimum flow control module 10, which specifies the minimum water flow that is required during a potential freeze condition, from the zone air temperature controller 8 to provide an output control signal, and from the anti-cavitation control module 26, which indicates when inlet and outlet pressures are such that a cavitation condition can occur. The zone air temperature controller 8 compares the room temperature sensor 1 and room setpoint device 2 values received from the local hardwired control input signal device 6, and determines if the valve 18 needs to proportionally open or close to maintain the desired room temperature. The pressure-dependent mode water valve position controller 11 uses a linear input signal to output command relationship that retains the inherent linear plug movement valve 18 water flow curve, unless an alternate curve adjustment has been optionally setup.

Typically, an HVAC coil is a fin and tube heat exchanger consisting of rows of thermally conductive water tubes usually copper connected to sheets of thermally conductive fins typically aluminum used to heat or cool air. A valve is used to vary the fluid flow through the coil. A modulating valve is typically selected so the pressure drop through its fully open body is at least 50% of the pressure drop across the piping system.

Valve controlled HVAC coil systems can either be two-pipe heating, two-pipe cooling, two-pipe heating and cooling, three-pipe heating and cooling, or four-pipe heating and cooling. All two-pipe systems have one pipe for the boiler or chiller and pump to supply the coil the fluid, and a second pipe to return the fluid back to the boiler or chiller.

With two-pipe heating and two-pipe cooling systems, the coil size and capacity and valve size and flow capacity are selected to provide the heat transfer to compensate for the heat loss (for heating systems) or heat gain (for cooling systems) in the controlled space. For heating applications, the coil size and capacity is based on the temperature difference between the source heating fluid temperature and the desired controlled space temperature along with the amount of heat loss in the controlled space. This fluid temperature to heat a space is usually quite large compared to the controlled space temperature with the absolute differential being 100° F. (55.5° C.) or more. For heating coil systems, fluid temperatures of 180° F. (82.2° C.) to 200° F. (93.3° C.) or higher are often needed to provide the coil thermal transfer to warm the controlled space to 70° F. (21.1° C.).

For cooling applications, the coil size and capacity is based on the temperature difference between the source cooling fluid temperature and the desired controlled space temperature along with the amount of heat gain in the controlled space. This fluid temperature to cool a space is usually fairly small compared to the controlled space temperature, with the absolute differential usually being 40° F. (22.2° C.) or less. For cooling coil systems, fluid temperatures of 40° F. (4.4° C.) to 45° F. (7.3° C.) are often needed to provide the coil thermal transfer to cool a controlled space to 75° F. (23.9° C.).

Two-pipe heating and cooling coils have one coil that is either heating with a hot fluid or cooling with a cold fluid. The volume of fluid required to heat a controlled space to its desired temperature is always different from the volume of water required to cool a space to its desired temperature because of the differences between the heating fluid temperature differential between the heating fluid and the controlled space temperature and the cooling fluid temperature differential between the cooling fluid and the controller space temperature, and because of the differences between the heat loss and cool gain characteristics of the controlled space.

Further, heating and cooling heat exchanges by the coil are different because the air heating is purely sensible heat because the sole effect is a change in temperature, while, with air cooling, the heat transfer is both sensible and latent because there may be condensation on the coil surface if the coil temperature is below the dew point of the air being cooled. The condensation is evident by water flowing out of the coil's drain pan.

For these reasons, two-pipe systems used for both heating and cooling will either provide good heat transfer for the controlled space when heating but is less adequate for cooling, or good heat transfer for the controlled space when cooling but is less adequate for heating.

Three- and four-pipe heating and cooling systems avoid the less adequate control of the two-pipe heating and cooling systems, because they have two coils that can have different sizes and capacities. The heating coil is selected to match the controlled space's sensible heat loss and the cooling coil is selected to match the controlled space's sensible and latent heat gain. The three- and four-pipe systems have one pipe for the boiler and pump to supply the heating coil fluid to the coil, and have a second pipe for the chiller and pump to supply the cooling coil fluid to the coil. The three-pipe heating and cooling system has one common return pipe for both the heating and cooling fluid, while the four-pipe heating and cooling systems have two separate return pipes; one for heating and the other for cooling.

The proper direction of opening and closing the valve is determined by the heat cool mode signal 3 for two-pipe systems used for both heating and cooling. The proper direction of opening and closing the valve 18 will vary depending if the valve water source is providing hot water which will require that the valve 18 open to warm up the room or cold water which will require that the valve 18 close to warm up the room. The heat cool mode signal 3 has a local non-volatile mode selection, which can be fixed to define the direction of opening or closing the valve 18 if it is always operated with hot or cold water, such as with a two-pipe system used for heating, a two-pipe system used for cooling, or a four-pipe system used for heating and cooling with two coils and two valves. The heat cool mode signal 3 can be overridden by the BMS from a remote location, by means of a serial communications bus, if the water temperature changes from hot to cold in the aforementioned two-pipe systems.

The zone air temperature controller 8 mathematically calculates the difference between the room temperature sensor 1 and room setpoint device 2 values, and then provides an empirical position for the linear valve stem movement actuator 14 using its adjustable proportional band setting. The empirical position for the linear valve stem movement actuator 14 uses the valve plug position sensor 23 and room temperature sensor 1 values to verify that the valve plug is being properly positioned to maintain the value input into the room setpoint device 2. The valve plug position sensor 23 feedback value is used to verify that the valve plug position is in its commanded position regardless of the internal valve pressures, which will change as the pump curve dynamically shifts along with the position of other valves in the piping system that affect the piping system's pressures.

The room temperature sensor 1 feedback value is used to verify that the calculated linear plug movement valve 18 position will provide the correct amount of heat transfer so that the room temperature sensor 1 will be at the same or very close to the room setpoint 2 value. Because the room heat loss and gain will not always be the same as the heat provided from the HVAC water coil heat transfer, via the linear plug movement valve 18, a varying temperature droop or offset difference will result at times between the room temperature sensor 1 and the room setpoint device 2 values. The temperature droop between the room temperature sensor 1 and room setpoint device 2 can be greatly minimized by the adjustable zone air temperature controller 8 integral setting, which provides a negative or positive adjustment value that is additive to the commanded position of the linear valve stem movement actuator 14. This will further drive the linear plug movement valve 18 to provide more or less heat to eliminate the difference between the room temperature sensor 1 and the room setpoint device 2 values. Also available in the zone air temperature controller 8 is an optional derivative setting to anticipate fast changes to the room temperature to improve the HVAC system response when there are large load changes.

In a particular embodiment, the pressure-dependent-mode water valve position controller 11 uses the zone air temperature controller 8 as its primary input, and then makes a comparison of its water pressure and flow calculation module 25 input and its water coil minimum flow control module 10 input to determine if the water and flow conditions are such that the calculated outputs of the zone air temperature controller 8 need to be overridden to a higher flow level to avoid a freeze condition of the HVAC water coil 63 (shown in FIG. 1) and associated piping system. The actual valve water temperature sensed by water temperature sensor 22 is used for freeze determination to avoid the issues that can result from assuming that the nearby air temperatures are the same as the water temperature. For example, an error such as this may cause the system to waste energy by forcing the water flow through the valve 18 to a full-flow condition when it is not required. It could also result in the system failing to sense a freezing water condition due to improper freeze stat mounting or due to air stratification.

The valve water temperature sensor 22 may be made from a resistive temperature device (RTD) that is located in the external wall of the linear plug movement valve 18 along with a thermally conductive grease to provide good heat transfer. The resistance of the RTD is measured by connecting it in series with a known reference resistor and applying a current to both resistances. The voltages across the resistances are then measured, and then digitized to represent the water temperature.

When a potential freeze condition is detected by the valve water temperature sensor 22, the water coil minimum flow control module 10 and pressure-dependent-mode water valve position controller 11 will override the zone air temperature controller 8 to provide the minimum amount of flow that is required to avoid a freeze condition as established by the remote minimum flow signal 5. In an example of system operation, the minimum flow continues until the water temperature rises at least 10° F. (5.6° C.) above the freeze temperature setpoint for 5 minutes or longer with the temperature differential, time period, and freeze temperature setpoint settings being field-adjustable by means of the freeze detection control module 27. In another example, the freeze protection is of the automatic reset type, and will revert back to zone air temperature control 8 after the temperature differential and time period requirements have been fulfilled.

Embodiments of the invention overcome a limitation of the traditional hard-wired automatic reset freeze stats of not alerting the building personnel that there may be a problem with the outdoor air ventilation controller, outdoor air ventilation actuator, or outdoor air ventilation damper, and also avoids a limitation of conventional hard-wired manual reset freeze stats in which normal control is disabled until the manual reset freeze stat is manually accessed and reset.

The anti-cavitation control module 26 uses the inlet valve pressure sensor 20, outlet valve pressure sensor 21, valve water temperature sensor 22, and the valve-specific cavitation coefficient to determine whether a cavitation condition exists, or to predict whether cavitation will occur. Since the water temperature affects the cavitation zone, which is also dependent on the valve's maximum allowable pressure differential, the anti-cavitation control module 26 uses the water temperature to calculate the fluid vapor pressure, which is used with the inlet valve pressure sensor 20, and with the outlet valve pressure sensor 21 to predict the point of incipient cavitation.

The valve-specific cavitation coefficient is unique to each valve, and is based on the ratio of the external inlet to external outlet pressure differential to the internal inlet to the minimum pressure in the valve pressure differential. Generally, the valve-specific cavitation coefficient is laboratory-confirmed by means of noise testing, as cavitation in a valve is usually a gradual process starting with only small portions of the valve plug experiencing vapor bubbles along with the consequential noise. The glycol content is used for a vapor pressure adjustment, as the vapor pressure varies with the water glycol mix as well as with the water temperature. Upon calculation of a possible cavitation condition by the anti-cavitation control module 26, the pressure-dependent-mode water valve position controller 11 overrides the zone air temperature controller 8 to reduce the valve's 18 differential pressure drop until it is out of the cavitation zone.

The maximum permissible pressure drop across the valve which is not to be exceeded to avoid cavitation is determined by the following calculations:

$\Delta P = VSCC*(P1-Pv)$ $\Delta P$=Pressure drop of incipient cavitation
VSCC=Valve Specific Cavitation Coefficient
P1=Valve Inlet Pressure (psia)
Pv=Vapor pressure of Water Mixture at Flowing Water Temperature (psia)
Psia=psig+14.7

The Pv is calculated by the anti-cavitation control module 26 look up table referencing the water mix glycol content and the water mix temperature.

In certain embodiments, the valve plug position sensor 23 is used for remote indication and verification that the actual flow matches the commanded position. The hardwired position output signal 28 and the remote communications control output signal device 29 receives signals from the valve plug position sensor 23 and water pressure and flow calculation module 25, and provide the true valve flow as a percentage of the total flow. The hardwired position output signal 28 provides a direct current output voltage signal, and the position output signal 30 provides a serial data communications numerical value output signal to the BMS that it receives from remote communications control output signal 29.

In embodiments of the invention, the hardwired position output signal 28 and the position output signal 30 overcome the inherent issues present in conventional control valves of estimating the water flow position from the valve actuator position. This conventional method introduces an error because the actuator position only indicates the valve plug position and not the flow percentage, because the valve 18 water flow is not always linear relative to its position, and because there is a mechanical linkage between conventional valve actuators and valves that can introduce an error from backlash, movement hysteresis, or malfunction.

For both pressure-dependent and pressure-independent operation, the remote communications control output signal device 29 receives relevant valve 18 and HVAC coil system 63 (shown in FIG. 1) data values, which may be transmitted to the BMS via the serial data communications bus. In some embodiments, this data may include the water flow information calculated by the water pressure and flow calculation module 25, the water temperature value provided by the valve water temperature sensor 22, energy information as calculated by the energy consumption calculation and retention module 24, diagnostics information received from the actuator stroke and force status module 17, diagnostic reports from the anti-cavitation control module 26, and the freeze control history from the freeze detection control module 27.

In a further embodiment, the energy consumption calculation and retention module 24 uses the valve water temperature sensor 22 and flow information from the water pressure and flow calculation module 25 to calculate the heat energy in British Thermal Units (BTU) or kilojoules for the International System of Units, along with totalized values for energy consumption tracking. The accumulated energy information can be cleared out by the BMS so that it can remotely store the information for permanent retention. The remote communications control output signal device 29 provides the position output signal 30, flow information 31, temperature information 32, and energy information 33 to the serial communications bus for remote energy reporting and retention.

In a particular embodiment, a diagnostics information module 34 provides diagnostics information received from the actuator stroke and force status module 17, including a determination as to whether the valve stroke length has changed due to debris in the valve 18 or from a mechanical linkage or valve component malfunction. This is detected by a comparison between the actuator's current operating stroke range and operating force and the initial stroke range and operating force that is retentively stored in the actuator. In an embodiment, the diagnostics information module 34 also provides diagnostic information received from the anti-cavitation control module 26 indication of the presence and duration of a cavitation condition. The freeze information module 35 provides information regarding the number of freeze occurrences and total freeze mode duration, for example, during the last seven days.

When the valve and actuator assembly 36 with integral freeze protection is setup for pressure-independent valve operation through the PI-PD mode jumper 16, the PI-PD mode selection device 15 receives its signal from the pressure-independent-mode water valve position controller 13. In a particular embodiment, the pressure-independent mode water valve position controller 13 uses inputs from the flow reset program 12, the water coil maximum flow controller 9, water coil minimum flow controller 10, and uses water flow information calculated by the water pressure and flow calculation module 25, and the anti-cavitation control module 26.

The flow reset program 12 converts calculated numerical position from the zone air temperature controller 8 for the linear valve stem movement actuator 14 to a calculated position to provide water flow control. As with the pressure-independent algorithm, the primary control is water flow control that is determined by the room temperature setpoint. The pressure-independent-mode water valve position controller 13 has an adjustable lower proportional band, upper proportional band, proportional lower/upper shift point, and upper and lower integral and derivative settings to obtain accurate and stable flow control. The two different proportional settings are available to de-sensitize the pressure-independent flow control at higher flow rates along with an adjustable shift point that determines if the upper proportional band, upper integral setting, and upper derivative setting are active, or if the lower proportional band, lower integral setting, and lower derivative setting is active.

The proportional band acts as the gain of the control loop. A small proportional band provides a higher gain or sensitivity, and a large proportional band provides less sensitive control. The lower proportional band setting is in effect at flow rates up to the adjustable shift point of the remote maximum flow signal 4, and the upper proportional band setting is in effect at flow rates above the adjustable shift point of the maximum flow signal 4. As with all the other valve and actuator assembly 36 with integral freeze protection settings, the lower proportional band, upper proportional band, proportional band lower/upper shift point, and upper and lower integral and derivative settings are preset to values that provide stable control for the typical HVAC water systems. The integral settings provide negative or positive adjustments factors that are additive to the linear valve stem movement actuator 14 commanded position when the controlled flow does not match the flow setpoint calculated by the flow reset program 12. Also available in the pressure-independent mode water valve position controller 13 are optional derivative settings to anticipate fast changes to the room temperature to improve the HVAC system response when there are large load changes. The pressure-independent mode water valve position controller 13 uses a linear output command relationship, which retains the linear plug movement valve 18 water flow curve, unless an alternate curve adjustment has been optionally setup.

The pressure-independent-mode water valve position controller 13 has a glycol content setting for specific gravity adjustment, as a glycol-water mixture has a higher specific gravity than pure water. As the specific gravity increases as a result of a higher concentration of glycol in the mixture, the water flow volume will be lower at the same linear plug movement valve 18 position than with pure water. The pressure-independent-mode water valve position controller 13 compensates for the glycol-water mixture by use of the glycol content for specific gravity adjustment.

The zone air temperature controller 8 resets the flow setpoint from the minimum flow level 174 shown from Point A 176 to Point B 172 in FIG. 13 to the maximum flow rate level 178, which starts at Point E 170 in FIG. 13. The water coil maximum flow controller 9 defines the maximum flow, which is selected to match the designed maximum flow rate of the HVAC water coil 63 (shown in FIG. 1). In a particular embodiment of the invention, the water coil minimum flow controller 10 establishes the minimum flow rate for the pressure-independent flow scaling and also establishes the minimum flow rate for freeze protection. The water coil minimum flow controller 10 operates using the same freeze protection sequence as when the valve and actuator assembly 36 is configured for pressure-dependent operation. In another embodiment of the invention, the water coil minimum flow controller 10 provides a dual minimum flow setting. The first flow setting is for freeze protection and is set at the minimum amount of flow that will avoid a freeze condition. The second minimum flow setting is received from the remote minimum flow signal 5 and is provided by the BMS for the purpose of synchronizing the minimum flow rate with the building's chillers and boilers to operate them at their most energy efficient inlet to outlet temperature differential. It should also be noted that the above-described synchronization may be applicable to equipment other than boilers and chillers. Generally, the linear valve stem movement actuator 14 may be configured to set a second minimum flow rate to synchronize the rate of flow such that a piece of equipment operates at its most efficient operating point.

Centrifugal chillers are designed to have their highest energy efficiency when they are fully loaded and operating at their design inlet to outlet water temperature differential. If the chillers have too low a temperature differential because the chilled water valve water flow is too high (providing a lower than ideal heat transfer) or too low a flow or no flow (causing little or no heat transfer), the chiller will operate inefficiently because the return water temperature is too low. Also one chiller operating inefficiently could require another chiller to be sequenced on requiring additional energy because both chillers are operating inefficiently. Additionally, this inefficient operation increases maintenance costs.

Mechanical heating equipment also does not operate at its designed efficiency if not fully loaded. With a condensing boiler, a higher return temperature can avoid the condensing process where the dew point of the exhaust gases cannot be met. If the boilers have too low a temperature differential because the heating valve flow is too high (providing a lower than ideal heat transfer) or too low a flow or no flow (causing little or no heat transfer), the boiler will operate inefficiently because the return water temperature is too high.

The anti-cavitation control module 26 uses the inlet valve pressure sensor 20, outlet valve pressure sensor 21, valve water temperature sensor 22, and the valve-specific cavitation coefficient to determine whether a cavitation condition exists, or to predict whether cavitation will occur. Since the water temperature affects the cavitation zone that is also dependent on the valve's maximum allowable pressure differential, the anti-cavitation control module 26 uses the water temperature to calculate the fluid vapor pressure, which is used with data from the inlet valve pressure sensor 20 and the outlet valve pressure sensor 21 to predict the point of incipient cavitation.

The valve-specific cavitation coefficient is unique to each valve and is based on the ratio of the external inlet to external outlet pressure differential to the internal inlet to the minimum pressure in the valve pressure differential. Generally, the valve-specific cavitation coefficient is laboratory confirmed by means of noise testing, as cavitation in a valve is usually a gradual process starting with only small portions of the valve plug 100 experiencing vapor bubbles along with the consequential noise. The glycol content is used for a vapor pressure adjustment as the vapor pressure varies with the water glycol mix as well as with the water temperature. Upon calculation of a possible cavitation condition by the anti-cavitation control module 26, the pressure-independent mode water valve position controller 13 overrides the flow reset program 12 to reduce the valve's differential pressure drop until it is out of the cavitation zone.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid control valve and actuator assembly comprising:
a valve configured to control a flow of liquid;
a valve actuator configured to control opening and closing of the valve, and further configured to provide both a maximum flow rate and a minimum flow rate of the liquid through the valve, the valve actuator having a communications module configured to facilitate communication with the valve actuator over a network, the communications module further configured to allow both remote monitoring of the flow through the valve, and remote control of the valve actuator;
wherein the valve and actuator assembly includes two modes of operation such that in one mode of operation the minimum flow rate is a freezing minimum flow rate and in another mode of operation the minimum flow rate is an energy-efficiency minimum flow rate, wherein the freezing minimum flow rate is provided to avoid a freeze condition and wherein the energy efficiency minimum flow rate corresponds to the flow rate of a piece of equipment at that piece of equipment's most energy efficient operating point, said freezing minimum flow rate and said energy-efficiency minimum flow rate collectively referred to as "dual minimum flow rates;" and
wherein one or both of the dual minimum flow rates and the maximum flow rate can be adjusted either locally or remotely.

2. The fluid control valve and actuator assembly of claim 1, wherein the communications module is configured to communicate with a networked control system over a serial communications bus.

3. The fluid control valve and actuator assembly of claim 2, wherein the networked control system is a building management system (BMS).

4. The fluid control valve and actuator assembly of claim 3, wherein signals from the BMS are retentively stored by the valve actuator, allowing the valve actuator to function properly if communication with the BMS is lost.

5. The fluid control valve and actuator assembly of claim 3, wherein the valve actuator is configured such that its operation can be synchronized with the BMS, and with a building's mechanical heating, cooling, and pumping systems to increase energy efficiency of the building's HVAC system.

6. The fluid control valve and actuator assembly of claim 1, wherein one or both of the dual minimum flow rates and the maximum flow rate are adjusted based on the temperature of the liquid being supplied to the valve.

7. The fluid control valve and actuator assembly of claim 1, wherein the valve controls the flow of liquid into an HVAC coil.

8. The fluid control valve and actuator assembly of claim 7, wherein the maximum flow rate is maintained via modulation of a valve plug position by the valve actuator, and wherein the maximum flow rate serves to limit the flow rate of liquid through the valve and HVAC coil to allow adequate time for heat transfer between the liquid and the HVAC coil.

9. The fluid control valve and actuator assembly of claim 7, wherein the maximum flow rate can be adjusted locally or remotely either to save energy in two-pipe liquid temperature changeover systems, or to compensate for piping and coil degradation.

10. The fluid control valve and actuator assembly of claim 7, wherein the maximum flow rate can be adjusted locally or remotely either to facilitate energy synchronization with the chillers and boiler, or to prevent coil overflow and maintain energy-efficient temperature differentials.

11. The fluid control valve and actuator assembly of claim 7, wherein the freezing minimum flow rate is provided to avoid a freeze condition in the HVAC coil, and in which the energy-efficiency minimum flow rate is provided for the purpose of synchronizing the flow rate with a boiler or chiller to operate that boiler or chiller at its most energy efficient operating point; and
wherein each of the dual minimum flow rates is maintained via modulation of a valve plug position by the valve actuator, and wherein the first minimum flow rate serves to prevent the freeze condition while minimizing energy consumption.

12. The fluid control valve and actuator assembly of claim 7, wherein the minimum flow rate serves to maintain a minimum temperature differential across an HVAC coil inlet and outlet.

13. The fluid control valve and actuator assembly of claim 1, wherein the valve actuator further comprises a temperature sensor, a flow rate meter, inlet and outlet pressure sensors, and a plug position sensor.

14. The fluid control valve and actuator assembly of claim 13, wherein data from the temperature sensor, flow rate meter, inlet and outlet pressure sensors, and plug position sensor is accessible either locally or remotely.

15. The fluid control valve and actuator assembly of claim 1, wherein the valve actuator has a plurality of adjustable operating parameters.

16. The fluid control valve and actuator assembly of claim 15, wherein the plurality of adjustable operating parameters can be adjusted either locally or remotely.

17. The fluid control valve and actuator assembly of claim 15, wherein, for pressure-independent valves, the plurality of adjustable operating parameters comprises one of upper and lower proportional band factors, integral and derivative factors, valve curve adjustment, anti-freeze content for specific gravity adjustment, and upper/lower shift point.

18. The fluid control valve and actuator assembly of claim 15, wherein, for pressure-dependent valves, the plurality of adjustable operating parameters comprises valve curve adjustment.

19. The fluid control valve and actuator assembly of claim 15, wherein the plurality of adjustable operating parameters comprises one of valve-specific cavitation coefficient, anti-freeze content for vapor pressure adjustment, and actuator sensitivity.

20. The fluid control valve and actuator assembly of claim 15, wherein the plurality of adjustable operating parameters comprises an offset for one of a room temperature sensor, a valve flow meter, a valve liquid temperature sensor, a valve inlet pressure sensor, and a valve outlet pressure sensor.

21. The fluid control valve and actuator assembly of claim 1, wherein the valve actuator further comprises an anti-cavitation module configured to determine if the liquid flowing through the valve is likely to cavitate.

22. The fluid control valve and actuator assembly of claim 21, wherein the anti-cavitation module determines a likelihood that cavitation will occur based on liquid temperature in the valve, valve inlet pressure, and valve outlet pressure.

23. The fluid control valve and actuator assembly of claim 22, wherein the anti-cavitation module is configured to modify its determination of the likelihood that cavitation will occur in the valve based on whether the liquid is water or a water-anti-freeze mixture.

24. The fluid control valve and actuator assembly of claim 1, wherein the valve actuator further comprises a diagnostics module configured to provide diagnostic information on operation of the valve and actuator assembly to a remote location.

25. The fluid control valve and actuator assembly of claim 24, wherein the diagnostics module provides diagnostic information regarding a number of cavitation occurrences, and a number of freeze condition occurrences for a predetermined period.

26. The fluid control valve and actuator assembly of claim 24, wherein the valve actuator is configured to retentively store the diagnostics information.

27. The fluid control valve and actuator assembly of claim 1, wherein the valve actuator comprises:
a motor and geartrain coupled to the throttling plug by a linkage assembly; and
a circuit board having control circuitry to regulate operation of the motor and geartrain, and communications circuitry to enable the actuator to communicate with a building management system via a serial communications bus.

28. The fluid control valve and actuator assembly of claim 1, wherein the valve actuator is configured to operate the valve as either a pressure-independent valve or a pressure-dependent valve.

* * * * *